US009581881B2

(12) United States Patent
Nishimura

(10) Patent No.: US 9,581,881 B2
(45) Date of Patent: Feb. 28, 2017

(54) FOCAL PLANE SHUTTER FOR CAMERAS AND DIGITAL CAMERA PROVIDED WITH THE SAME

(71) Applicant: Nidec Copal Corporation, Tokyo (JP)

(72) Inventor: Kohei Nishimura, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 14/423,548

(22) PCT Filed: Aug. 22, 2013

(86) PCT No.: PCT/JP2013/072403
§ 371 (c)(1),
(2) Date: Feb. 24, 2015

(87) PCT Pub. No.: WO2014/030696
PCT Pub. Date: Feb. 27, 2014

(65) Prior Publication Data
US 2015/0229817 A1 Aug. 13, 2015

(30) Foreign Application Priority Data
Aug. 24, 2012 (JP) ................. 2012-185908

(51) Int. Cl.
G03B 9/08 (2006.01)
G03B 9/66 (2006.01)
(Continued)

(52) U.S. Cl.
CPC ............. *G03B 9/08* (2013.01); *G03B 9/14* (2013.01); *G03B 9/66* (2013.01); *G03B 9/18* (2013.01);
(Continued)

(58) Field of Classification Search
None
See application file for complete search history.

(56) References Cited

U.S. PATENT DOCUMENTS 6,850,281 B2  2/2005 Takahashi
8,197,150 B2  6/2012 Yamaguchi et al.
(Continued)

FOREIGN PATENT DOCUMENTS

JP  2001-215555  8/2001
JP  2001-222059  8/2001
(Continued)

OTHER PUBLICATIONS

International Search Report dated Nov. 26, 2013, which issued during prosecution of International Application No. PCT/JP2013/072403, which corresponds to the present application.

Primary Examiner — Justin P Misleh
(74) Attorney, Agent, or Firm — Troutman Sanders LLP

(57) ABSTRACT

A focal plane shutter includes: a first blade-driving unit that makes switches between normally open and normally closed methods; a second blade-driving first unit engaging with and locked by a locking unit in a cocking operation of the cocking unit so as to keep a second blade covering the exposure opening, and making the second blade move away from the exposure opening when the second blade-driving first unit is released from the engagement with the locking unit just before the cocking unit reaches to its cocking position; and a second blade-driving second unit rotated by the cocking operation of the cocking unit in a direction bringing the second blade-driving second unit to its cocking state, and rotating the second blade-driving first unit in a direction in which the second blade-driving first unit is made to perform its exposure operation, so as to make the second blade cover the exposure opening.

12 Claims, 23 Drawing Sheets

(51) Int. Cl.
  *G03B 9/14* (2006.01)
  *G03B 9/36* (2006.01)
  *G03B 9/18* (2006.01)
  *G03B 9/24* (2006.01)
  *H04N 5/225* (2006.01)

(52) U.S. Cl.
  CPC .............. *G03B 9/24* (2013.01); *G03B 9/36* (2013.01); *H04N 5/2254* (2013.01)

(56) References Cited

U.S. PATENT DOCUMENTS

| | | | |
|---|---|---|---|
| 2001/0010560 A1 | 8/2001 | Takahashi | |
| 2011/0129212 A1 | 6/2011 | Yamaguchi et al. | |
| 2011/0164871 A1* | 7/2011 | Shintani | G03B 9/40 396/484 |
| 2011/0176799 A1* | 7/2011 | Shintani | G03B 9/14 396/484 |
| 2011/0222843 A1* | 9/2011 | Ai | G03B 9/22 396/469 |
| 2012/0106945 A1 | 5/2012 | Kawakami | |
| 2012/0219280 A1 | 8/2012 | Nishimura et al. | |
| 2014/0168457 A1* | 6/2014 | Shintani | G03B 9/20 348/220.1 |
| 2014/0226964 A1* | 8/2014 | Shintani | G03B 9/32 396/453 |

FOREIGN PATENT DOCUMENTS

| | | |
|---|---|---|
| JP | 2003-222928 | 8/2003 |
| JP | 2004-061865 | 2/2004 |
| JP | 2005-173132 | 6/2005 |
| JP | 2007-155774 | 6/2007 |
| JP | 2007-298544 | 11/2007 |
| JP | 2011-113060 | 6/2011 |
| JP | 2011-137986 | 7/2011 |
| JP | 2011-164331 | 8/2011 |
| JP | 2012-098355 | 5/2012 |
| JP | 2012-177765 | 9/2012 |

* cited by examiner

SEQUENCE OF OPERATION (NCL STATE)

FOCAL PLANE SHUTTER FOR CAMERAS AND DIGITAL CAMERA PROVIDED WITH THE SAME

CROSS-REFERENCE TO RELATED APPLICATION

This is a U.S. national phase application under 35 U.S.C. §371 of International Patent Application No. PCT/JP2013/072403, filed on Aug. 22, 2013, and claims benefit of priority to Japanese Patent Application No. JP 2012-185908, filed on Aug. 24, 2012. The International Application was published on Feb. 27, 2014, as International Publication No. WO 2014/030696 under PCT Article 21(2). The entire contents of these Applications are hereby incorporated herein by reference.

TECHNICAL FIELD

This invention relates to a focal plane shutter for cameras and to a digital camera provided with the same.

BACKGROUND

Focal plane shutters for digital cameras include focal plane shutters each of which is provided with a first blade and a second blade. This type of focal plane shutter has had substantially the same structure as focal plane shutters for film-based cameras do, formerly. A first blade-driving mechanism for focal plane shutters of this type is composed of a first blade-driving unit and a first blade-driving spring, and a second blade-driving mechanism for focal plane shutters of this type is comprised of a second blade-driving unit and a second blade-driving spring. A first blade and a second blade are connected directly to the first blade-driving unit and the second blade-driving unit, respectively. In shooting, these two blade-driving units are rotated by the elastic forces of the first blade-driving and second blade-driving springs respectively, in turn. And, the first blade opens an exposure opening and then the second blade closes the exposure opening afterward, so that the light-receiving plane of an image sensor like CCD is exposed.

And, when the exposure operations of the first and second blades are complete, imaging information is transferred from the image sensor to a storage device through an information-processing circuit while the second blade is covering the exposure opening. Afterward, a cocking operation of focal plane shutter of this type is immediately performed in such a way that a cocking unit rotated from its initial position makes these two blade-driving units reverse up to their cocking positions against the elastic forces of the respective blade-driving springs. As a result, in a focal plane shutter of this type, the second blade stays away from the exposure opening in a state in which the cocking operation is complete, or a state in which the focal plane shutter of this type is on standby for shooting.

Also, mechanisms for preventing the two blade-driving units from rotating until an exposure operation is performed in next shooting include mechanisms called "locking type" and mechanisms called "direct type". The locking-type mechanisms are formed in such a way that blade-driving units are made to engage with locking units respectively to be locked in respective their cocking positions. As a result, the cocking unit may be made to immediately return to its initial position when the cocking operation is complete, or the cocking unit may be made to return to its initial position before the exposure opening-opening operation of the first blade in releasing camera shutter. And, the respective locking units are operated by respective electromagnets and the respective blade-driving units are released from the respective engagements with the locking units in turn, so that the exposure operations of the first and second blades are performed.

On the other hand, the direct-type mechanisms are formed in such a way that: each of the two blade-driving units is provided with a iron piece element; and the cocking unit rotates these blade-driving units, until these iron piece elements come into contact with electromagnets not magnetized respectively as a result of the cocking operation. As a result, in the direct-type focal plane shutters, the cocking unit does not return to its initial position even after the iron piece elements come into contact with the electromagnets not magnetized respectively, so that the cocking unit keeps the iron piece elements coming into contact with the electromagnets not magnetized. And, when a release button of a camera is pressed in next shooting and each of the electromagnets is magnetized to attract and hold the iron piece elements, the cocking unit is made to return to its initial position. And, afterward, each of the electromagnets is demagnetized to release the respective iron piece elements from the magnetic attractions due to the electromagnets in turn, so that the exposure operations of the first and second blades are performed.

Both in the case where this type of focal plane shutter is formed as a locking-type focal plane shutter and in the case where this type of focal plane shutter is formed as a direct-type focal plane shutter, the exposure opening is closed by the first blade in a state in which this type of focal plane shutter is on standby for shooting, so that this type of focal plane shutter is in a so-called normally closed (NCL) state. Accordingly, digital cameras provided with this type of focal plane shutter are usually provided with optical view finders, respectively.

Now, there has occurred the necessity that digital cameras provided with focal plane shutter should also include electronic view finders with a crystal liquid display device or the like respectively, as well as digital cameras provided with lens shutters, in recent years. Accordingly, while the number of cameras each of which is provided with only an optical view finder as before has decreased, the number of cameras each of which is provided with both of an optical view finder and an electronic view finder or provided with only an electronic view finder has increased. And, although there is a publically-known manner in which a camera is provided with another image sensor for an electronic view finder other than an image sensor for shooting in the case where the camera is provided with the electronic view finder, it is usual to use a single image sensor both for displaying an image and for capturing an image.

However, in the case where a single image sensor is used both for displaying an image and for capturing an image, a focal plane shutter in such a case has to be formed in such a way that: not only a second blade, but also a first blade is made to stay away from an exposure opening, in the cocking state of the focal plane shutter; and, when a release button is pressed in shooting, the first blade is operated to cover the exposure opening at its initial stage, and the first blade and the second blade are made to perform their exposure operation in turn at the next stage. That is to say, the focal plane shutter has to be made to fall in a so-called normally open (NOP) state in which, while the second blade is made to operate from a state of the second blade closing the exposure opening to a state of the second blade opening the exposure opening, the first blade is not made to operate from a state of the first blade opening the exposure opening to a state of the first blade closing the exposure opening, in the cocking operation.

In order to achieve such operations of the first and second blades, a focal plane shutter is formed in such a way that: the first blade-driving mechanism is composed of two units which are a first blade-driving first unit directly connected to the first blade and a first blade-driving second unit directly biased by the first blade-driving spring; in the cocking operation, only the first blade-driving second unit is moved to its cocking position in the cocking operation of the focal plane shutter so that the first blade keeps opening the exposure opening to make it possible to observe an object with the electronic view finder; when a release button is pressed in shooting, the cocking unit is returned from its cocking position to its initial position at its initial stage, the first blade-driving first unit is rotated by the elastic force of a spring weaker than the first blade-driving spring in the process of the return of the cocking unit to its initial position (where the spring weaker than the first blade-driving spring is called "first blade-cocking spring" below), so that first blade is moved to close the exposure opening; and, at the next stage, the first blade-driving second unit makes the first blade perform its exposure operation while the first blade-driving second unit is being accompanied by the first blade-driving first unit, and then the second blade-driving unit subsequently makes the second blade perform its exposure operation. For example, Japanese Patent Application Publication TOKUKAI No. 2001-222059 ("the JP '059") discloses such a focal plane shutter.

However, the focal plane shutter disclosed in the JP '059 is formed in such a way that, when a release button is pressed in shooting and then the cocking unit returns to its initial position at the initial stage, the first blade-driving first unit is moved just before the return of the cocking unit to its initial position is complete, so that the first blade closes the exposure opening. And, in this case, the first blade-driving first unit is rotated from a state of the first blade completely opening the exposure opening to a state of the first blade completely closing the exposure opening by the elastic force of the first blade-cocking spring, in one sitting. Accordingly, if any countermeasures are not taken, the first blade bounces large when the operation of the first blade closing the exposure opening is complete, so that the exposure operation of the first blade is not allowed to start until the bounce of the first blade stops. For example, Japanese Patent Application Publication TOKUKAI No. 2003-222928 ("the JP '928") discloses a focal plane shutter formed in such a way that, when the cocking unit returns from its cocking position to its initial position, the first blade-driving first unit is moved at the initial stage of the operation of the coking unit returning to its initial position so that the first blade is made to start to close the exposure opening early.

However, although the JP '928 discloses a structure for making it possible to rotate the first blade-driving first unit at the stage where the cocking unit returns to its initial position when a release button is pressed in shooting, the structure for the focal plane shutter disclosed in the JP '928 is not necessarily favorable for mass-producing focal plane shutters. Now, for example, Japanese Patent Application Publication TOKUKAI No. 2007-298544 ("the JP '544") discloses a focal plane shutter formed in such a way that: in the process of returning the cocking unit to its initial position, the first blade-driving first unit is indirectly made to follow the return operation of the cocking unit from the beginning of the process so as to make the first blade close the exposure opening; and the first blade-driving first unit is made to stop following the return operation of the cocking unit before the cocking unit completely returns to its initial position, so that the bounce of the first blade is small and the first blade favorably is stopped when the cocking unit stops in its initial position. The focal plane shutter disclosed in the JP '544 has a structure extremely favorable also for mass-production.

Now, the trend of endowing cameras with multi-function has been increasingly progressing recently, so that it is demanded that even the focal plane shutters formed as described above to make it possible to perform shooting by operating two shutter blades should be formed to make it possible to perform shooting both in the normally open method and in the normally closed method by making a selection from these method by a user before the shooting.

On the other hand, focal plane shutters used for cameras at present include a focal plane shutter in which shooting performed in the normally open method and shooting performed in the normally closed method can be switched to each other, for example, like a focal plane shutter disclosed in Japanese Patent Application Publication TOKUKAI No. 2011-113060 ("the JP '060") and offered by the present applicant.

Now, a digital camera provided with a conventional focal plane shutter as disclosed in the JP '059, the JP '928, or the JP '544, is formed in such a way that: imaging information from an image sensor is transferred to a storage device when the second blade covers the exposure opening after the exposure operation is complete; the cocking unit is rotated after the transfer of the imaging information is complete, in order to perform the cocking operation of the focal plane shutter; and the second blade is made to perform its exposure opening-opening operation to fully open the exposure opening, for example, as shown in FIG. 11. And, the reason why the cocking operation is started after the transfer of the imaging information from the image sensor to the storage device is complete is that, if the cocking operation is started immediately after the exposure operation is complete, light entering through the exposure opening during the transfer of the imaging information meets the image sensor and the imaging information is inevitably spoiled, as known publically.

Also, even in the focal plane shutter which is disclosed in the JP '060 and in which shooting performed in the normally open method and shooting performed in the normally closed method can be switched to each other, imaging information from an image sensor is transferred to a storage means when a second blade covers an exposure opening after the exposure operation is complete, a cocking unit is rotated after the transfer of the imaging information is complete so that the cocking operation is performed, and then the second blade open the exposure opening, so that the cocking operation starts after the transfer of the imaging information from the image sensor to the storage device.

Also, this type of focal plane shutter is formed in such a way that: the cocking operation of the focal plane shutter is performed by rotating the cocking unit by a camera body-side unit; and, at this point, the cocking unit makes the first blade-driving second unit and the second blade-driving unit rotate from their exposure operation-completion positions to their cocking positions against the strong elastic forces of the first blade-driving and second blade-driving springs as described above, respectively. As a result, such a cocking operation requires time which is overwhelmingly longer than time necessary for the exposure operation.

Accordingly, in conventional focal plane shutters having this type of structure, time which it takes to acquire a standby state of the focal plane shutter for next shooting (a cocking operation-completion state) from the time the exposure operation is complete cannot be merely determined by taking only time necessary for the cocking operation into consideration, and time which it takes to acquire a standby state of the focal plane shutter for next shooting from the time the exposure operation is complete is forced to become all the more long due to the necessity to secure time necessary for the transfer of the imaging information to the storage device. Accordingly, such a structure is not necessarily favorable for the case where a user wants to perform the next shooting immediately after the completion of shooting or for the case where shooting is performed with a continuous-shooting mode.

The present invention is made in order to solve such problems. An aspect of the present invention is to offer: a focal plane shutter for cameras which makes it possible to switch shooting in the normally open method and shooting in the normally closed method to each other, which makes it possible to determine the length of time from the completion of an exposure operation to next shooting while time necessary for transferring imaging information is being hardly taken into consideration, and which makes it possible to improve continuous-shooting speed; and a digital camera provided with the same.

SUMMARY

In order to achieve such an aspect, a focal plane shutter for cameras according to the present invention which makes it possible to switch shooting in a normally open method and shooting in a normally closed method to each other is characterized in that the focal plane shutter includes: a first blade-driving unit which can make a first blade stay away from an exposure opening when a cocking unit is in its cocking position and make the first blade cover the exposure opening in an operation of the cocking unit returning to its initial position, in shooting performed in a normally open method, and which can make the first blade cover the exposure opening from the time the cocking unit is in its cocking position to the time an exposure operation of the focal plane shutter starts after a return of the cocking unit to its initial position, in shooting performed in a normally closed method; a second blade-driving first unit which engages with and is locked by a locking unit in a cocking operation of the cocking unit so as to keep a second blade covering the exposure opening and makes the second blade move away from the exposure opening when the second blade-driving first unit is released from the engagement with the locking unit just before the cocking unit reaches to its cocking position; and a second blade-driving second unit which is rotated by the cocking operation of the cocking unit in a direction bringing the second blade-driving second unit to its cocking state and which rotates the second blade-driving first unit in the exposure operation in a direction in which the second blade-driving first unit is made to perform its exposure operation, so as to make the second blade cover the exposure opening.

Also, in a focal plane shutter for cameras according to the present invention, it is preferred that the focal plane shutter is formed to operate in such a way that the first blade completely covers the exposure opening through the first blade-driving unit before the second blade-driving first unit is released from the engagement with the locking unit, when the cocking unit performs its cocking operation in shooting performed in the normally closed method.

Also, in a focal plane shutter for cameras according to the present invention, it is preferred that the focal plane shutter is formed to have a structure in which: the cocking unit includes a first pushing portion; the locking unit includes a first portion to be pushed; and the first pushing portion of the cocking unit pushes the first portion to be pushed of the locking unit just before the completion of the cocking operation of the cocking unit so that the second blade-driving first unit is released from the engagement with the locking unit.

Also, in a focal plane shutter for cameras according to the present invention, it is preferred that the focal plane shutter is formed to have a structure in which: the cocking unit further includes a second pushing portion; the first blade-driving unit includes a second portion to be pushed; and the second pushing portion of the cocking unit pushes the second portion to be pushed of the first blade-driving unit in a cocking operation of the focal plane shutter in shooting performed in the normally closed method so that the first blade-driving unit makes the first blade cover the exposure opening.

Also, in a focal plane shutter for cameras according to the present invention, it is preferred that: the first blade-driving unit includes a prevention part which comes into contact with a prevention unit to prevent the first blade-driving first unit from rotating in a direction in which the first blade is made to close the exposure opening or is released from the contact with the prevention unit to release the first blade-driving first unit from the prevention of the rotation of the first blade-driving first unit in that direction, the rotation of the first blade-driving unit in that direction making the first blade close the exposure opening; and shooting performed in the normally open method and shooting performed in the normally closed method are switched to each other in accordance with the prevention of the rotation of the first blade-driving first unit in the direction in which the first blade is made to close the exposure opening or the release of the first blade-driving unit from the prevention of the rotation of the first blade-driving first unit in that direction, the rotation of the first blade-driving unit in that direction making the first blade close the exposure opening.

Also, in a focal plane shutter for cameras according to the present invention, it is preferred that the first blade-driving unit includes: a first blade-driving second unit which is biased by a first blade-driving spring in a direction in which the first blade-driving second unit is made to perform its exposure operation; and a first blade-driving first unit which is connected to the first blade and is biased by a cocking spring in the direction opposite to the direction in which the first blade-driving second unit is made to perform its exposure operation.

Also, in a focal plane shutter for cameras according to the present invention, it is preferred that: the prevention unit includes a prevention element capable of moving in a direction in which the prevention element is made to prevent the first blade-driving first unit from being rotated in the direction in which the first blade is made to close the exposure opening or capable of moving in a direction in which the prevention element is made to release the first blade-driving first unit from the prevention of a rotation of the first blade-driving first unit in that direction, the rotation of the first blade-driving first unit in that direction making the first blade close the exposure opening; and, in the case of shooting performed in the normally open method, the prevention element operates in such a way that: the prevention element releases the first blade-driving first unit from the prevention of a rotation of the first blade-driving first unit in that direction, the rotation of the first blade-driving first unit in that direction making the first blade close the exposure opening, after the cocking operation of the cocking unit is complete; the prevention element moves in the direction in which the prevention element is made to prevent a rotation of the first blade-driving first unit in that direction, the rotation of the first blade-driving first unit in that direction making the first blade close the exposure opening, before an exposure operation of the focal plane shutter after the first blade-driving first unit rotates to make the first blade close the exposure opening; the prevention element brakes a rotation of the first blade-driving first unit in a direction in which the first blade is made to open the exposure opening, just before the exposure operation is complete; and then the prevention element prevents the first blade-driving first unit from being rotated in the direction in which the first blade is made to close the exposure opening, when the exposure operation is complete.

Also, in a focal plane shutter for cameras according to the present invention, it is preferred that the prevention unit is an electromagnetic device and the prevention element is a mover for the electromagnetic device, the mover for the electromagnetic device being capable of moving in a reciprocating manner.

Also, in a focal plane shutter for cameras according to the present invention, it is preferred that the prevention unit includes a spring capable of moving the prevention element in the direction in which the prevention element is made to prevent a rotation of the first blade-driving first unit in such a direction as the first blade is made to close the exposure opening, and an electromagnetic device: capable of moving the prevention element against an elastic force of the spring capable of moving the prevention element in the direction in which the prevention element is made to prevent the rotation of the first blade-driving first unit in the direction which makes the first blade close the exposure opening, so as to release the first blade-driving first unit from the prevention of the rotation of the first blade-driving first unit in the direction, the rotation of the first blade-driving first unit in the direction making the first blade close the exposure opening; and capable of releasing the prevention element from such a movement of the prevention element against the elastic force of the spring as releases the first blade-driving first unit from the prevention of the rotation of the first blade-driving first unit in the direction which makes the first blade close the exposure opening.

Also, in a focal plane shutter for cameras according to the present invention, it is preferred that the prevention element also has a function of preventing the first blade-driving first unit from bouncing on completion of the exposure operation.

Also, in a focal plane shutter for cameras according to the present invention, it is preferred that the locking unit also has a function of preventing the second blade-driving first unit from bouncing on completion of the exposure operation.

In addition, a digital camera according to the present invention is provided with one of the above-described focal plane shutters for cameras, so that it is possible to perform next shooting early and it is possible to perform favorable continuous shooting.

Advantageous Effects of Inventions

According to the present invention, in a focal plane shutter for cameras which makes it possible to switch shooting performed in a normally open method and shooting performed in a normally closed method to each other, a second blade-driving mechanism is formed to include: a second blade-driving first unit which makes the second blade open the exposure opening when the second blade-driving first unit is rotated by the elastic force of a second blade-cocking spring; and a second blade-driving second unit which rotates the second blade-driving first unit against the elastic force of the second blade-cocking spring when the second blade-driving second unit is rotated by the elastic force of a second blade-driving spring, so that the second blade is made to close the exposure opening. And, the focal plane shutter of the present invention is formed to have a structure in which the second blade-driving first unit is locked by the locking unit to prevent a rotation of the second blade-driving first unit at the start of a cocking operation, only the second blade-driving second unit is rotated against the elastic force of the second blade-driving spring, and then the second blade-first unit is released from the lock by the locking unit at the final stage of the cocking operation so that the second blade-driving first unit can be rotated by the elastic force of the second blade-cocking spring. As a result, it is possible to start the cocking operation without taking time necessary for transferring imaging information from an image sensor to a storage device into consideration, so that next shooting can be performed earlier in focal plane shutters according to the present invention than in conventional focal plane shutters in the prior art. Accordingly, focal plane shutters according to the present invention have the advantage of not missing a perfect moment for a good shot as compared with conventional focal plane shutters in the prior art. Also, because of the advantage, focal plane shutters according to the present invention have not only the advantage of being capable of obtaining pictures at a higher frame rate but also the advantage of being capable of improving continuous shooting speed, in the case of continuous shooting.

More specifically, in a focal plane shutter for cameras according to the present invention, the second blade can be kept intercepting light from an image frame until just before a completion of a cocking operation of the shutter after a start of the cocking operation of the shutter in shooting performed in the normally open method, so that it is possible to transfer data on images captured in the cocking operation from the image sensor to the storage, it is possible to shorten time necessary for a sequence of the processes ranging from shooting to the capture of the data, and it is possible to make a frame rate high also in a image sensor needing a long data-transferring time. Also, the focal plane shutter according to the present invention is formed to have a structure in which the first blade completely closes the exposure opening before the locking unit releases the second blade from the lock by the locking unit, so that it is possible to transfer data on images captured in the cocking operation from the image sensor to the storage while the image frame is not being opening in the middle of the cocking operation of the shutter also in shooting performed in the normally closed method, it is possible to shorten time necessary for the sequence of the processes ranging from shooting to the capture of the data, and it is possible to make a frame rate high also in an image sensor needing a long data-transferring time.

Accordingly, according to the present invention, it is possible to obtain: a focal plane shutter for cameras in which shooting performed in the normally open method and shooting performed in the normally closed method can be switched to each other, which can make a frame rate high, and which makes it possible to determine the period from the time the exposure operation is complete to the time next

BRIEF DESCRIPTION OF DRAWINGS

FIG. 11 is a timing chart showing an operation sequence of the transfer of the imaging information and the shutter-cocking operation.

FIG. 19 is a timing chart showing an operation sequence of the transfer of the imaging information and the shutter-cocking operation.

FIG. 20 is a plane view showing a state of the focal plane shutter in which the cocking unit has returned to its initial position after a release button of a camera is pressed from the state shown in FIG. 5 and showing a state of the focal plane shutter just before the exposure operation of the focal plane shutter starts.

FIG. 22 is a timing chart showing an operation sequence of the transfer of the imaging information and the shutter-cocking operation.

FIG. 23 is a timing chart showing an operation sequence of the transfer of the imaging information and the shutter-cocking operation.

DETAILED DESCRIPTION

Figure 1:
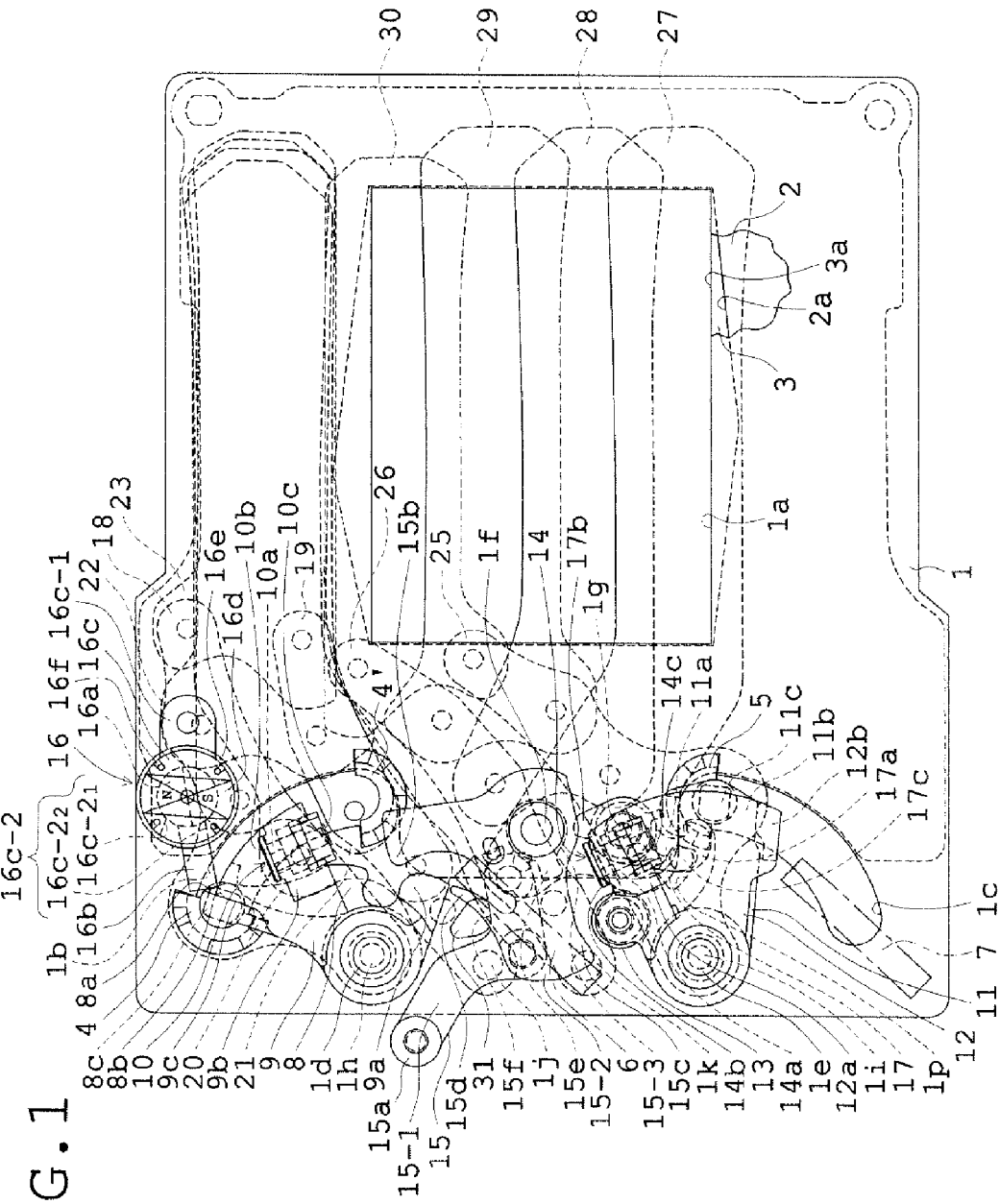
FIG. 1 is a plane view showing a state of a focal plane shutter for cameras of an embodiment according to the present invention just after the completion of an exposure operation of the focal plane shutter, in the normally open method or in the normally closed method with an electronic shutter instead of a first blade.
Figure 2:
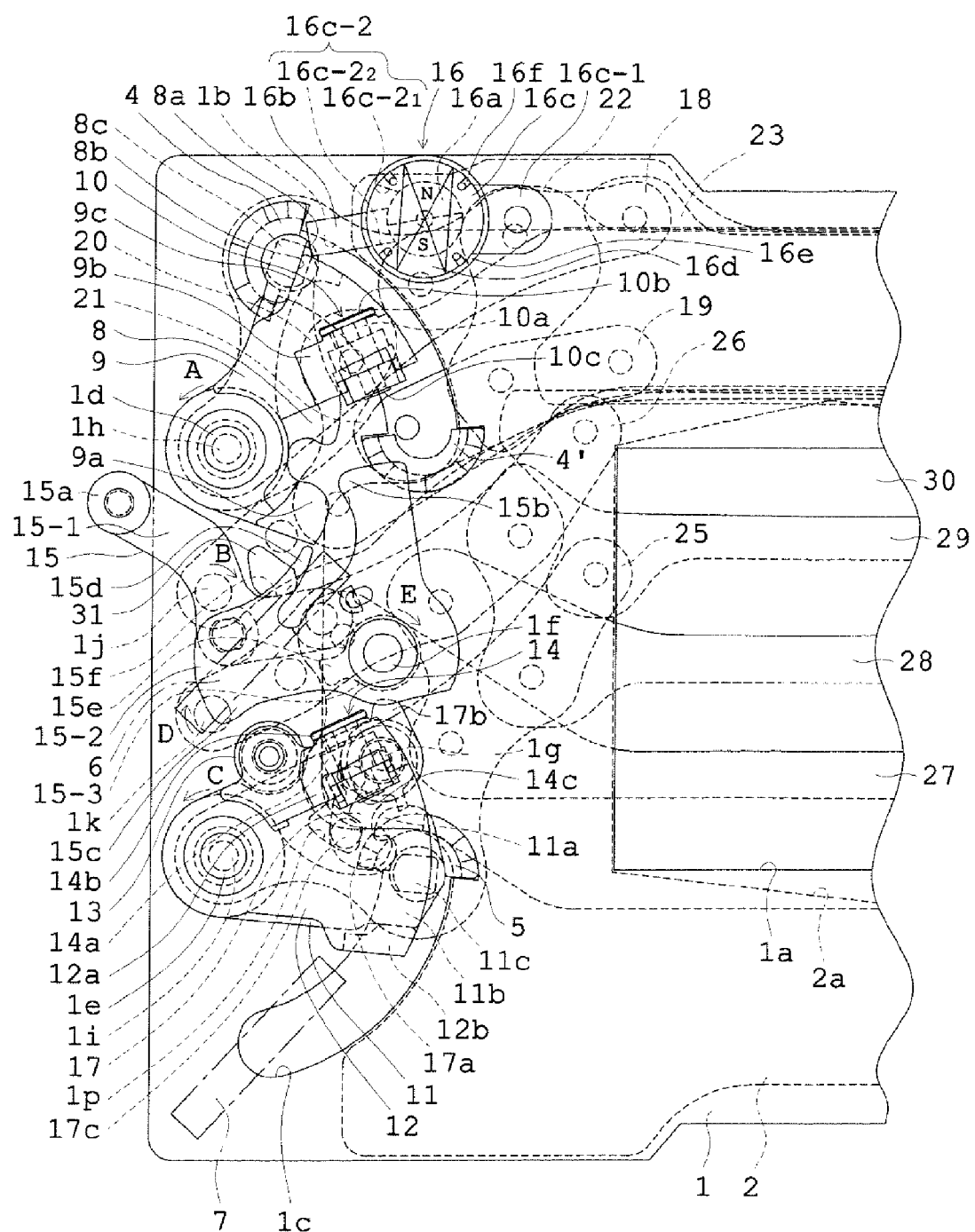
FIG. 2 is a plane view showing the approximately left-side half part of the focal plane shutter shown in FIG. 1 while the approximately left-side half part is being enlarged.

The embodiment of the present invention shown in the drawings is explained, below. The focal plane shutter of the present embodiment is formed by applying the present invention to the structure of the direct-type focal plane shutter. However, the present invention can be also applied to locking-type focal plane shutters. And, persons skilled in the art can easily understand it through below-described explanations.
Embodiment First, the constitution of the focal plane shutter of the present embodiment according to the present invention is explained mainly using FIGS. 1 and 2. FIG. 1 is a plane view showing a state of the focal plane shutter of the embodiment just after the completion of the exposure operation of the focal plane shutter, in the normally open method or in the case where an electronic shutter of an image sensor is used for the focal plan shutter instead of the first blade. FIG. 2 is a plane view showing the approximately left-side half part of the focal plane shutter shown in FIG. 1 while the approximately left-side half part is being enlarged. Besides, the present embodiment is explained while it is being presumed that, when the focal plane shutter of the present embodiment is incorporated into a camera, the face side of FIG. 1 (this side) corresponds to the object side (the imaging-lens side) and the other side of FIG. 1 corresponds to the image-sensor side. However, as known publically in the cases of digital cameras, the image-sensor side may be fixed at the face side of FIG. 1, and the object side may be fixed at the other side of FIG. 1.

In FIG. 1, a shutter base plate 1 is provided with an oblong rectangle-shaped exposure opening 1a which is located on the approximately middle portion of the shutter base plate 1. Also, as known publically, a middle plate 2 and an auxiliary base plate 3 are fitted on the back side of the shutter base plate 1 in turn while the middle plate 2 is at a predetermined distance from the auxiliary base plate 3. A blade room for a first blade is formed between the shutter base plate 1 and the middle plate 2, and a blade room for a second blade is formed between the middle plate 2 and the auxiliary base plate 3. And, the middle plate 2 and the auxiliary base plate 3 are also provided with openings 2a and 3a respectively, the openings 2a and 3a being similar to the opening 1a but being somewhat different from the opening 1a in shape and size. And, the shape of the exposure opening as a shutter unit through which light from an object passes may be formed by two or more openings of the openings 1a, 2a, and 3a. However, the shape of the exposure opening is determined by only the shape of the opening 1a in the present embodiment.

Besides, the shutter base plate 1 in the present embodiment is made of synthetic resin. Also, in order to make it possible to see parts of the middle plate 2 and the auxiliary base plate 3, some area of the shutter base plate 1 which is adjacent to the opening 1a is intentionally omitted in FIG. 1. In addition, while the external shape of the middle plate 2 is drawn with broken line in FIGS. 1 and 2, the external shape of the auxiliary base plate 3 is not illustrated in FIGS. 1 and 2 because the auxiliary base plate 3 has approximately the same external shape as the shutter base plate 1 does. The external shape of the auxiliary base plate 3 is not illustrated also in FIGS. 3 to 10, FIGS. 12 to 18, and FIGS. 20 and 21.

Two arc-shaped slots 1b and 1c are formed on a portion of the shutter base plate 1 on the left side of the opening 1a. Publicly-known buffer components 4, 4', and 5 the plane shapes of which are approximately shaped like the letter "C" and which are made of rubber are fitted to the both ends of the slot 1b and the upper end of the slot 1c, respectively. Also, the middle plate 2 has a shape by which the middle plate 2 does not overlap with the area of the shutter base plate 1 on which the slots 1b and 1c are formed. And, because the auxiliary base plate 3 is a thin plate and overlaps with the area of the shutter base plate 1 on which the slots 1b and 1c are formed, the auxiliary base plate 3 is practically provided with slots not shown in the drawings, the slots on the auxiliary base plate 3 having approximately the same shape as the slots 1b and 1c do and being formed on the portions of the auxiliary base plate 3 which overlaps with the slots 1b and 1c respectively.

The shutter base plate 1 is provided with shafts 1d, 1e, 1f, and 1g which erect on the face side of the shutter base plate 1, or on the object-side of the shutter base plate 1. The shaft 1g of these shafts is shorter than the other shafts 1d, 1e, and 1f. Also, the shutter base plate 1 is provided with shafts 1h, 1i, 1j, and 1k which erect on the back side of the shutter base plate 1, or on the image-sensor side of the shutter base plate 1. The shafts 1h and 1i of these shafts are concentric with the shafts 1d and 1e, respectively. Also, the shutter base plate 1 is provided with a stopper 31 which is located on the face side of the shutter base plate 1. In addition, the shutter base plate 1 is provided with a circle-shaped short hole 1p which is located near a buffer component 4 on the face side of the focal plane shutter 1 and is on a circle around the shaft 1g.

Not only these shafts, but also a plurality of pillars are erectly provided on the face side of the shutter base plate 1 practically, and a supporting plate and a print board as disclosed also in the JP '544 are fixed to the top ends of a plurality of the pillars while the supporting plate is being placed nearer to the shutter base plate 1 than the print board. And, electromagnets for the first blade and for the second blade are fitted on the supporting plate while the electromagnets are being placed on the shutter-base-plate-1 side of the supporting plate, each of the electromagnets consisting of: an iron core element which is approximately shaped like the letter "U" and the top ends of the two leg parts of which play a role as magnetic pole; and a bobbin around which a coil is wound to be fitted to one of the leg parts of the iron core element. However, because the constitution of these electromagnets and the constitution for fitting these electromagnets on the supporting plate are publically known and the illustration of the whole structures of these electromagnets makes it difficult to illustrate the other components, only the iron core elements 6 and 7 of the electromagnets are illustrated with a long dashed double-short dashed line in FIGS. 1 and 2, as well as FIGS. 3 to 10, FIGS. 12 to 18, and FIGS. 20 and 21.

A first blade-driving first unit 8 and a first blade-driving second unit 9, which constitute the first blade-driving mechanism and are made of synthetic resin, are fitted to the shaft 1d erectly provided on the face side of the shutter base plate 1, in such a way that: the first blade-driving first unit 8 is placed nearer to the shutter base plate 1 than the first blade-driving second unit 9; and the first blade-driving first and second units 8 and 9 can be rotated around the shaft 1d separately from each other. Besides, the shape of the first blade-driving first unit 8 of them is shown more intelligibly in FIG. 4 than in FIGS. 1 and 2.

First, the first blade-driving first unit 8 includes a prevention part 8a, a pushed part 8b, and a driving pin 8c. The pushed part 8b and the driving pin 8c of them are provided on the face side and back side of the first blade-driving first unit 8, respectively, while the pushed part 8b is being aligned with the driving pin 8c. The driving pin 8c which is provided on the back side of the first blade-driving first unit 8 is inserted into the slot 1b of the shutter base plate 1. And, the sectional plane of a potion on the root side of the driving pin 8c is shaped like a circle, and the arc-shaped surface on the root side of the driving pin 8c meets the buffer component 4. In addition, the sectional plane of a portion on the top-end side of the driving pin 8c has a shape like a shell, and, as described below, the top end part of the driving pin 8c is connected to the first blade in the blade room. The extreme portion of the top end of the driving pin 8c is inserted into the slot: which is provided for the auxiliary base plate 3; which has approximately the same shape as the slot 1b does; and which is not shown in the drawings. Besides, the sectional plane of the potion on the root side of the driving pin 8c may be shaped like the letter, "D". Also, the sectional plane of the portion on the top-end side of the driving pin 8c may have an oval shape. Also, a prevention part 8a is formed to be shaped like a concave surface with a gradual curvature.

On the other hand, the first blade-driving second unit 9 includes a pushed part 9a, a fitting part 9b the object-side portion of which is thicker than the other side portion of the fitting part 9b, and a pushing part 9c. As known publically, the first blade-driving second unit 9 is biased by a first blade-driving spring not shown in the drawings so that the first blade-driving second unit 9 is rotated in the counter-clockwise direction (or in a rotation direction indicated by an arrow A around the shaft 1d in FIG. 2) by the elastic force of the first blade-driving spring. As known publically, an iron piece element 10 and a compression spring not shown in the drawings are placed inside the fitting part 9b. The pushing part 9c of them is a part for pushing the pushed part 8b which is provided for the first blade-driving first unit 8 when the first blade-driving second unit 9 is rotated in the counterclockwise direction (or in the rotation direction indicated by the arrow A around the shaft 1d in FIG. 2).

Also, the iron piece element 10 includes a disk-shaped head part 10b which is placed in one end of a shaft part 10a of the iron piece element 10, and an iron piece part 10c is fitted to the other end of the shaft part 10a. And, the iron piece element 10 is biased by the compression spring fitted to the shaft part 10a in the fitting part 9b so that the iron piece part 10c is made to protrude from the inside of the fitting part 9b. On the other hand, the focal plane shutter is kept in states of the focal plane shutter shown in FIGS. 1 and 2 by the contact between the head part 10b and the edge of the fitting part 9b.

A second blade-driving first unit 11 and a second blade-driving second unit 12, which constitute the second blade-driving mechanism and are made of synthetic resin, are fitted to the shaft 1e erectly provided on the face side of the shutter base plate 1, in such a way that: the second blade-driving first unit 11 is placed nearer to the shutter base plate 1 than the second blade-driving second unit 12; and the second blade-driving first and second units 11 and 12 can be rotated around the shaft 1e separately from each other.

The second blade-driving first unit 11 includes an engaged part 11a, a pushed part 11b, and a driving pin 11c. The driving pin 11c which is provided on the back side of the second blade-driving first unit 11 is inserted into the slot 1c of the shutter base plate 1. And, the sectional plane of a portion on the root side of the driving pin 11c is shaped like a circle, and the arc-shaped surface of the portion on the root side of the driving pin 11c meets the buffer component 5. In addition, the sectional plane of a portion on the top-end side of the driving pin 11c has a shape like a shell, and, as described below, the top end part of the driving pin 11c is connected to the second blade in the blade room. The extreme portion of the top end of the driving pin 11c is inserted into the slot: which is provided for the auxiliary base plate 3; which has approximately the same shape as the slot 1c does; and which is not shown in the drawings. Besides, the sectional plane of the portion on the root side of the driving pin 11c may be formed to be shaped like the letter, "D". In addition, the sectional plane of the portion on the top-end side of the driving pin 11c has a shape like an oval shape.

On the other hand, the second blade-driving second unit 12 includes: a fitting part 12a the object-side portion of which is thicker than the other side portion of the fitting part 12a; and a pushing part 12b which is provided on the shutter-base-plate-1 side of the second blade-driving second unit 12. And, a roller 13 as a pushed part is fitted to the shutter base plate 1-side face of the second blade-driving second unit 12. And, as known publically, the second blade-driving second unit 12 is biased by a second blade-driving spring not shown in the drawings so that the second blade-driving second unit 12 is rotated in the counterclockwise direction (or in the rotation direction indicated by an arrow C around the shaft 1e in FIG. 2) by the elastic force of the second blade-driving spring. The pushing part 12b is a part for pushing the pushed part 11b which is provided for the second blade-driving first unit 11 when the second blade-driving second unit 12 is rotated in the counterclockwise direction.

An iron piece element 14 and a compression spring not shown in drawings are placed also inside the fitting part 12a of the second blade-driving second unit 12. And, the iron piece element 14 includes a disk-shaped head part 14b which is placed in one end of a shaft part 14a of the iron piece element 14, and an iron piece part 14c is fitted to the other end of the shaft part 14a. Also, the iron piece element 14 is biased by the compression spring fitted to the shaft part 14a in the fitting part 12a so that the iron piece part 14c is made to protrude from the inside of the fitting part 12a. On the other hand, the focal plane shutter is kept in states of the focal plane shutter shown in FIGS. 1 and 2 by the contact between the head part 14b and the edge of the fitting part 12a.

A cocking unit 15, which is made of synthetic resin, is rotatably fitted to the shaft 1f erectly provided on the face side of the shutter base plate 1. The cocking unit 15 includes: a pushed part 15a which is pushed by a camera body-side unit not shown in the drawings; a pushing part 15b which pushes the pushed part 9a of the first blade-driving second unit 9; a pushing part 15c which pushes the roller 13 fitted to the second blade-driving second unit 12; and a braking part 15d which is flexible and is pushed by the pushed part 9a of the first blade-driving second unit 9 to be bent. In addition, the cocking unit 15 further includes a thick part which is placed on the shutter base plate 1-side face of the cocking unit 15 and by which the shaft 1f is surrounded. The thick part of the cocking unit 15 is provided with a pushing part 15e. In addition, the cocking unit 15 includes a contact part 15f which is located on an arm-shaped portion 15-1 of the cocking unit 15, the arm-shaped portion 15-1 including the pushed part 15a.

And, the cocking unit 15 is biased by a return spring not shown in the drawings so that the cocking unit 15 is rotated in the clockwise direction (or in a rotation direction indicated by an arrow E around the shaft 1f in FIG. 2). On the other hand, FIGS. 1 and 2 show a state of the focal plane shutter in which the contact part 15f meets a stopper 31 provided on the shutter base plate 1, with the result that the clockwise rotation of the cocking unit 15 (or the rotation of the cocking unit 15 in the direction indicated by the arrow E around the shaft 1f in FIG. 2) due to the elastic force of such a return spring is stopped. Hereafter, this position of the cocking unit 15 in this state is called "initial position".

Besides, the cocking unit 15 in the present embodiment is formed in such a way that: only the arm-shaped portion 15-1 including the pushed part 15a and the contact part 15f is made of metal; a portion 15-2 of the cocking unit 15 which includes the pushing parts 15b and 15c and the braking part 15d is made of soft synthetic resin; and the three portions of the arm-shaped portion 15-1, the portion 15-2, and the other portion 15-3 of the cocking unit 15 (that is the thick part of the cocking unit 15 provided with the pressing 15e) are integrated with one another to be made to constitute a single part in such a way that: the metal portion 15-1 is fitted to the shutter-base-plate-1 side surface of the synthetic resin portion 15-2 with a screw (to which no reference numeral is given): and the portion 15-3 is integrated with the synthetic resin portion. Although the cocking unit 15 for the present embodiment can be made of only synthetic resin, it is not easy to make parts having such a shape with one kind material of synthetic resin in terms of mass-production. For example, although the pushed part 15a is repeatedly and strongly pushed by the camera body-side unit, the pushed part 15a is provided on the top end of the slender arm-shaped portion of the cocking unit 15. Accordingly, the arm-shaped portion of the cocking unit 15 has to be made to have endurable strength. Also, sophisticated techniques for molding process are needed in order to make only the braking part 15d have flexibility without making the other portions of the coking unit 15 have flexibility. Accordingly, in the case where parts like the cocking unit 15 for the present embodiment are actually mass-produced, the optimum manner for making the cocking unit 15 is such that: only the arm-shaped portion 15-1 including the pushed part 15a is made of metal; the portion 15-2 including the braking part 15d is made of soft synthetic resin; and the three portions of the arm-shaped portion 15-1, the portion 15-2, and the other portion 15-3 of the cocking unit 15 are integrated with one another to be made to constitute a single part, as in the present embodiment.

A prevention unit 16 is fitted to the shutter base plate 1 with a screw not shown in the drawings, with the prevention unit 16 located on the face side of the shutter base plate 1. The prevention unit 16 of the present embodiment is an electromagnetic device the structure of which is a variation of the structure of a publically known current-controlled actuator disclosed in Japanese Patent TOKUKAI No. 2005-173132 or the like. The prevention unit 16 is formed in such a way that: a rod-like prevention element 16b is made of synthetic resin and is formed to have a convex surface with such a gradual curvature as the surface of the top portion of the prevention unit 16 can come into contact with the surface of a prevention part 8a of the front blade-driving first unit 8 shown in FIGS. 1 and 2 so as to prevent the front blade-driving first unit 8 from rotating clockwise from its position shown in FIGS. 1 and 2; and the rod-like prevention element 16b is integrated with a permanent magnetic rotator 16a with the rod-like prevention element 16b perpendicular to a shaft around which the permanent magnetic rotator 16a rotates.

More specifically, the prevention unit 16 includes: the permanent magnetic rotator 16a, the prevention element 16b, a stator frame 16c, a coil 16d, a yoke 16e, and a magnetic rod 16f.

The stator frame 16c is shaped like a cup that is formed by closing one edge of a cylinder. A room for holding the permanent magnetic rotator 16a is formed between the stator frame 16c and a plate-shaped stator frame not shown in the drawings. And, the permanent magnetic rotator 16a is supported by bearing parts in the holding room, and then the coil 16d is wound around the stator frame 16c along a groove that is formed on the outside of the holding room while the bearing parts are being surrounded by the coil 16d, so that these components of the prevention unit 16 are integrated with one another. And, afterward, the cylinder-shaped yoke 16e is fitted to the stator frame 16c.

The stator frame 16c is provided with a window 16c-2, the prevention element 16b is made to protrude from the window to the outside, and the prevention element 16b can be rotated by the permanent magnetic rotator 16a in a reciprocating manner in a predetermined range of angles between side edges 16c-$2_1$ and 16c-$2_2$ of the window 16c-2. Also, as shown in FIG. 2, four magnetic rods 16f are inserted into the stator frame 16c from the object side with the four magnetic rods 16f parallel to the shaft around which the permanent magnetic rotator 16a rotates (and only one of the four magnetic rods is given the reference numeral "16f" in the drawings for the sake of convenience). In addition, the stator frame 16c is provided with an overhanging part 16c-1, and the prevention unit 16 is fitted to the shutter base plate 1 by screwing the overhanging part 16c-1 to the shutter base plate 1 with a screw not shown in the drawings. Besides, as known publically, the number of magnetic rods 16f is not limited to four.

The permanent magnetic rotator 16a is magnetized in the diametrical direction. When the coil 16d is electrified in the reverse direction, the permanent magnetic rotator 16a is rotated in the counterclockwise direction, and then a lateral portion of the prevention element 16b meets the side edge 16c-$2_2$ of the window 16c-2, so that the counterclockwise rotation of the permanent magnetic rotator 16a is stopped. Also, the coil 16d is electrified in the forward direction, the permanent magnetic rotator 16a is rotated in the clockwise direction, and then the lateral portion of the prevention element 16b meets the side edge 16c-$2_1$ of the window 16c-2, so that the clockwise rotation of the permanent magnetic rotator 16a is stopped.

And, even though the supply of current to the coil 16d is cut off when the lateral portion of the prevention element 16b meets the side edge 16c-$2_2$ of the window 16c-2, force that makes the permanent magnetic rotator 16a rotate in the counterclockwise direction is applied to the permanent magnetic rotator 16*a* as a result of magnetic force of the permanent magnetic rotator 16*a* interacting with those of the four magnetic rods 16*f*, so that the lateral portion of the prevention element 16*b* is kept meeting the side edge 16*c*-2$_2$ of the window 16*c*-2. Also, even though the supply of current to the coil 16*d* is cut off when the lateral portion of the prevention element 16*b* meets the side edge 16*c*-2$_1$ of the window 16*c*-2, force that makes the permanent magnetic rotator 16*a* rotate in the clockwise direction is applied to the permanent magnetic rotator 16*a* by the same reason as described above, so that the lateral portion of the prevention element 16*b* is kept meeting the side edge 16*c*-2$_1$ of the window 16*c*-2.

Figure 11:
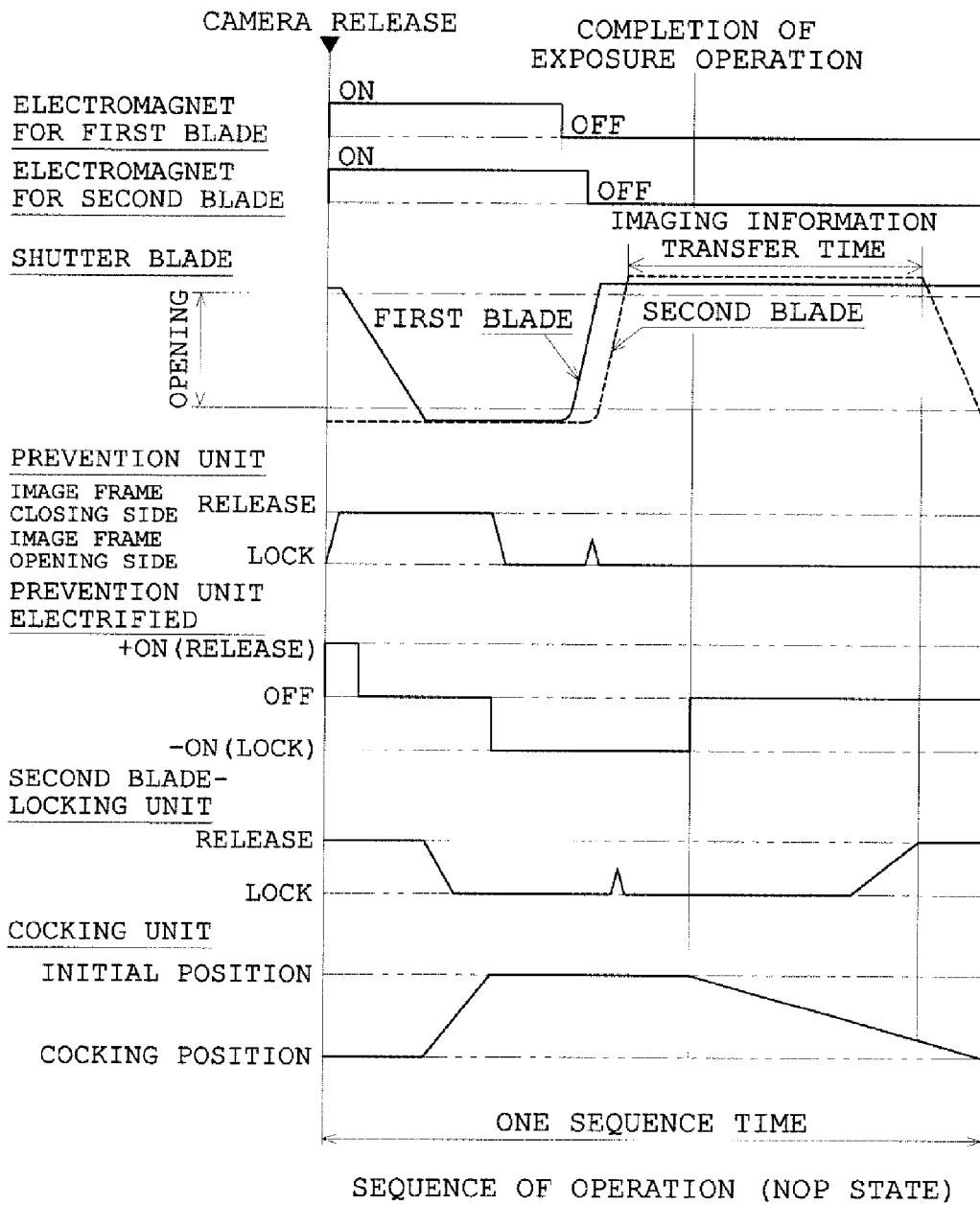
FIG. 11 is an explanatory view showing an operation sequence of each main unit when a press of the release button of the camera after the completion of the cocking operation of the focal plane shutter, the exposure operation of the focal plane shutter, and then the cocking operation of the focal plane shutter are performed, in the normally open method in the focal plane shutter for cameras according to the present embodiment.

Besides, for example, "+ON" of "PREVENTION UNIT" in the timing chart shown in FIG. 11 means a state in which a control signal for rotating the permanent magnetic rotator 16*a* clockwise is sent out and the coil 16*d* is electrified in the forward direction, and "-ON" of "PREVENTION UNIT" in the timing chart shown in FIG. 11 means a state in which a control signal for rotating the permanent magnetic rotator 16*a* counterclockwise is sent out and the coil 16*d* is electrified in the reverse direction, as described above. And, "OFF" of "PREVENTION UNIT" in the timing chart shown in FIG. 11 means a state in which: neither a control signal for rotating the permanent magnetic rotator 16*a* clockwise nor a control signal for rotating the permanent magnetic rotator 16*a* counterclockwise is sent out; and the coil 16*d* is not electrified. These are true of the other timing charts.

Besides, when the lateral portion of the prevention element 16*b* meets the side edge 16*c*-2$_2$ of the window 16*c*-2, the prevention element 16*b* is located in the trajectory of the operation of the prevention part 8*a* of the first blade-driving first unit 8, and the prevention element 16*b* reaches to the upper end portion of the arc-shaped elongate hole 1*b*. Also, when the lateral portion of the prevention element 16*b* meets the side edge 16*c*-2$_2$ of the window 16*c*-2 with the driving pin 8*c* meeting the buffer component 4, the surface of the top of the prevention element 16*b* can came into contact with the surface of the prevention part 8*a* of the first blade-driving first unit 8.

A locking unit 17, which is made of synthetic resin, is rotatably fitted to the shaft 1*g* erectly provided on the object-side face of the shutter base plate 1. The locking unit 17 includes: an engagement part 17*a* which engages with the engaged part 11*a* of the second blade-driving first unit 11, with the result that the clockwise rotation of the second blade-driving first unit 11 is prevented; a pushed part 17*b* which is pressed by the pushing part 15*e* of the cocking unit 15; and a stopper pin 17*c*. And, the locking unit 17 is biased by a spring not shown in the drawings so that the locking unit 17 is rotated in the counterclockwise direction by the spring. On the other hand, FIGS. 1 and 2 show a state of the focal plane shutter in which a rotation of the locking unit 17 is stopped by an edge of the hole 1*p* of the shutter base plate 1 that meets the stopper pin 17*c*.

Next, the structures on the back side of the shutter base plate 1 are explained. First, a first blade which is placed between the shutter base plate 1 and the middle plate 2 is composed of: an arm 18 one end of which is pivotally fitted to the shaft 1*h* of the shutter base plate 1; an arm 19 one end of which is pivotally fitted to the shaft 1*j* of the shutter base plate 1; and four plate blades 20, 21, 22, and 23 which are pivotally supported by the arms 18 and 19 toward the free ends of the arms 18 and 19 in turn, or toward the other ends of the arms 18 and 19 in turn. The plate blade 23 becomes a slit-forming blade for the first blade. And, as known publically, the top end of the driving pin 8*c* of the first blade-driving first unit 8 is fitted into an elongate hole formed in the arm 18, the elongate hole being not shown in the drawings.

Also, a first blade-cocking spring which is a helical torsion coil spring is fitted to the shaft 1*j* of the shutter base plate 1, the first blade-cocking spring being not shown in the drawings. And, one end of the first blade-cocking spring is connected to the spring-connection part provided for the shutter base plate 1, the spring-connection part being not shown in the drawings, and the other end of the first blade-cocking spring is connected to a hole of the arm 19 (which has no reference numeral), with the result that the arm 19 is biased by the first blade-cocking spring in such a way that the arm 19 is rotated in the clockwise direction (or in the rotation direction indicated by the arrow B around the shaft 1*j* in FIG. 2). As a result, the first blade-driving first unit 8 is biased indirectly by the first blade-cocking spring through the first blade to be rotated in the clockwise direction. Besides, the elastic force of the first blade-cocking spring is set to be weaker than that of the first blade-driving spring by which the first blade-driving second unit 9 is biased to be rotated in the counterclockwise direction.

Except for the manner of providing the first blade-cocking spring as in the present embodiment, publically known manners of providing such cocking springs include: a manner in which one end of a cocking spring is connected to the shutter base plate 1 and the other end of the cocking spring is connected to the first blade-driving first unit 8, on the face side of the shutter base plate 1; and a manner in which one end of a cocking spring is connected to the first blade-driving second unit 9 and the other end of the cocking spring is connected to the first blade-driving first unit 8, on the face side of the shutter base plate 1. Accordingly, the present invention also allows such manners except the manner of providing cocking springs as in the present embodiment. However, the manner of providing the first blade-cocking spring as in the present embodiment makes it possible to use the first blade-cocking spring 24 also as a publically known looseness-removing spring for the first blade (or as a spring which is connected to the arm 19 so that the looseness between the components constituting the first blade is gotten rid of and the position of the slit-forming blade for the first blade in the exposure operation-starting position is invariable). Accordingly, the manner of providing the first blade-cocking spring in the present embodiment is advantageous.

On the other hand, the second blade which is placed between the middle plate 2 and the auxiliary base plate 3 is composed of: an arm 25 one end of which is pivotally fitted to the shaft 1*i* of the shutter base plate 1; an arm 26 one end of which is pivotally fitted to the shaft 1*k* of the shutter base plate 1; and four plate blades 27, 28, 29, and 30 which are pivotally supported by the arms 25 and 26 toward the free ends of the arms 25 and 26 in turn, or toward the other ends of the arms 25 and 26 in turn. The plate blade 30 becomes a slit-forming blade for the second blade. Also, as known publically, the top end of the driving pin 11*c* of the second blade-driving first unit 11 is fitted into an elongate hole formed in the arm 25, the elongate hole being not shown in the drawings.

Also, a second blade-cocking spring which is a helical torsion coil spring is fitted to the shaft 1*k* of the shutter base plate 1, the second blade-cocking spring being not shown in the drawings. And, one end of the second blade-cocking spring is connected to the spring-connection part provided for the shutter base plate 1, the spring-connection part being not shown in the drawings, and the other end of the second blade-cocking spring is connected to a hole of the arm 26

(which has no reference numeral), with the result that the arm 26 is biased by the second blade-cocking spring in such a way that the arm 26 is rotated in the clockwise direction (or in the rotation direction indicated by the arrow D around the shaft 1k in FIG. 2). As a result, the second blade-driving first unit 11 is biased indirectly by the second blade-cocking spring through the second blade to be rotated in the clockwise direction. And, the elastic force of the second blade-cocking spring is weaker than that of the second blade-driving spring which is connected to the second blade-driving second unit 12 and which is not shown in the drawings. And, the second blade-cocking spring is also used also as a publically known looseness-removing spring for the second blade (or as a spring which is connected to the arm 26 so that the position of the slit-forming blade for the second blade in the exposure operation-starting position is invariable). However, the second blade-cocking unit may be connected directly to the second blade-driving first unit 11. Besides, the arrows A, B, C, D, and E are shown only in FIG. 2 for the sake of convenience.

Figure 18:
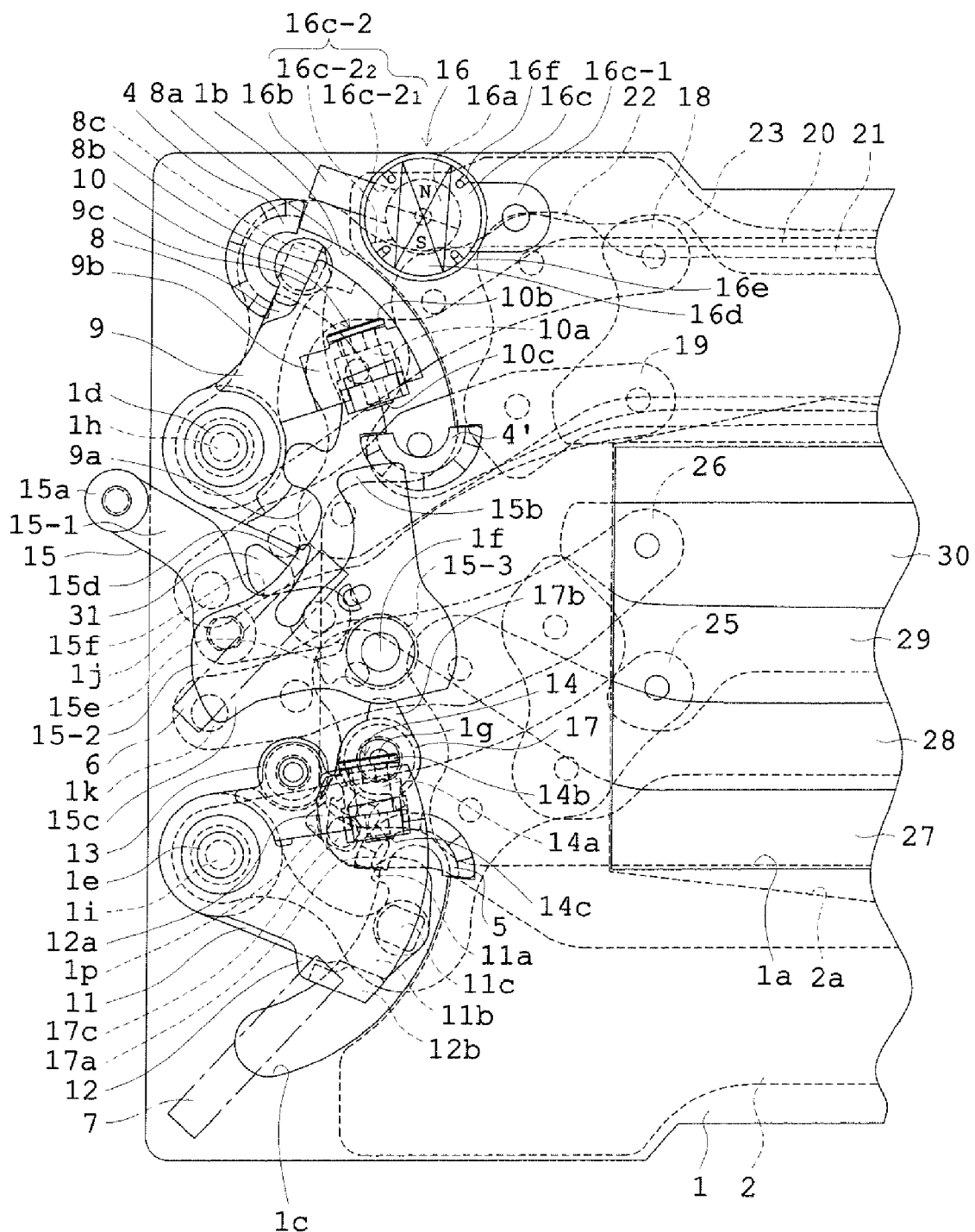
FIG. 18 is a plane view showing a state of the focal plane shutter in which the cocking unit brakes the first blade-driving first unit and the locking unit brakes the second blade-driving first unit just before the exposure operations of the first and second blades are complete from the state shown in FIG. 17.
Figure 19:
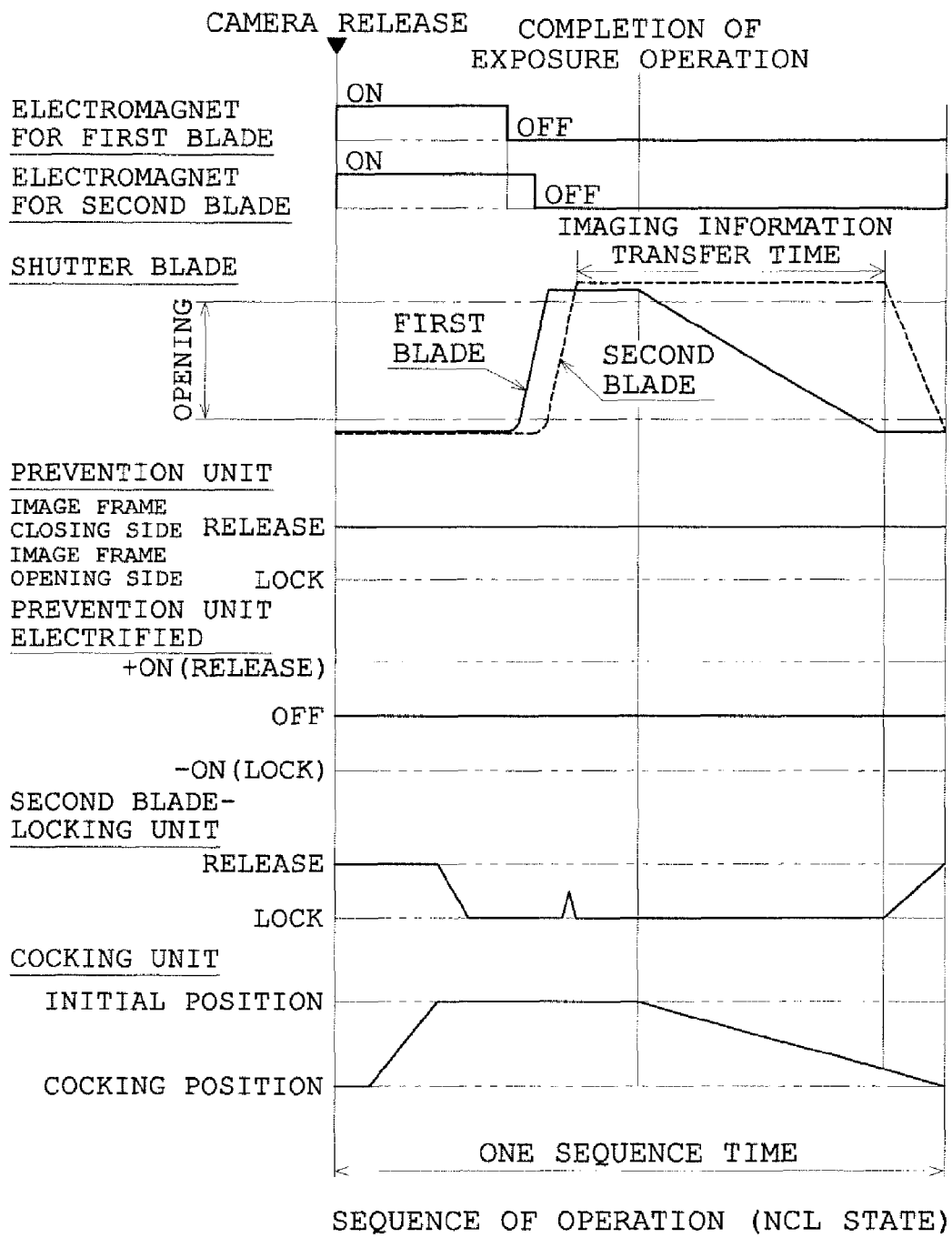
FIG. 19 is an explanatory view showing an operation sequence of each main unit when a press of the release button of the camera after the completion of the cocking operation of the focal plane shutter, the exposure operation of the focal plane shutter, and then the cocking operation of the focal plane shutter are performed, in the normally closed method in the focal plane shutter for cameras according to the present embodiment.

Next, the operation of the focal plane shutter of the present embodiment is explained using FIG. 2 which is used in the above explanation of the constitution of the focal plane shutter, and FIGS. 3 to 22. Besides, FIGS. 11, 19, and 22 are charts in which the length of time from the time a release button of a camera is pressed to the time the focal plane shutter reaches a state of the focal plane shutter being on standby for next shooting is regarded as one cycle and which intelligibly shows the timing of each of the operations of the main component units for the present embodiment.

FIG. 2 shows a state of the focal plane shutter just after the exposure operation of the focal plane shutter is complete, as explained already. At this point, the first blade-driving second unit 9 is biased by the publically-known first blade-driving spring which is not shown in the drawings, in such a way that the first blade-driving second unit 9 is rotated in the counterclockwise direction. And, the pushing part 9c of the first blade-driving second unit 9 pushes the pushed part 8b of the first blade-driving first unit 8 against the elastic force of the first blade-cocking spring not shown in the drawings, and then the driving pin 8c of the first blade-driving first unit 8 is made to come into contact with the buffer component 4. As a result, this state of the first blade-driving first unit 8 stopping is maintained. And, at this point, the four plate blades 20 to 23 for the first blade are stored in the upper area of the opening 1a with the four plate blades 20 to 23 overlapping with one another.

On the other hand, the second blade-driving second unit 12 is biased by the publically known second blade-driving spring which is not shown in the drawings, in such a way that the pushing part 12b of the second blade-driving second unit 12 pushes the pushed part 11b of the second blade-driving first unit 11 against the elastic force of the second blade-cocking spring not shown in the drawings so that the second blade-driving first unit 11 is rotated in the counter-clockwise direction. However, because the driving pin 11c of the second blade-driving first unit 11 comes into contact with the buffer component 5, this state of the second blade-driving first unit 11 stopping is maintained. And, at this point, the four plate blades 27 to 30 for the second blade are unfolded and cover the opening 1a. Also, the stopper pin 17c meets the edge of the hole 1p which is provided for the shutter base plate 1, to prevent the locking unit 17 from being rotated in the counterclockwise direction by the elastic force of the spring which is not shown in the drawings. And, when the second blade-driving first unit 11 is rotated in the clockwise direction, the engaged part 11a engages with and is locked by the engagement part 17a, so that the clockwise rotation of the second blade-first unit 11 is prevented.

Also, at this point, the cocking unit 15 is in its initial position, and the pushing part 15b of the cocking unit 15 separates from the pushed part 9a of the first blade-driving second unit 9, and the other pushing part 15c of the cocking unit 15 separates from the roller 13 which is fitted to the second blade-driving second unit 12.

Figure 23:
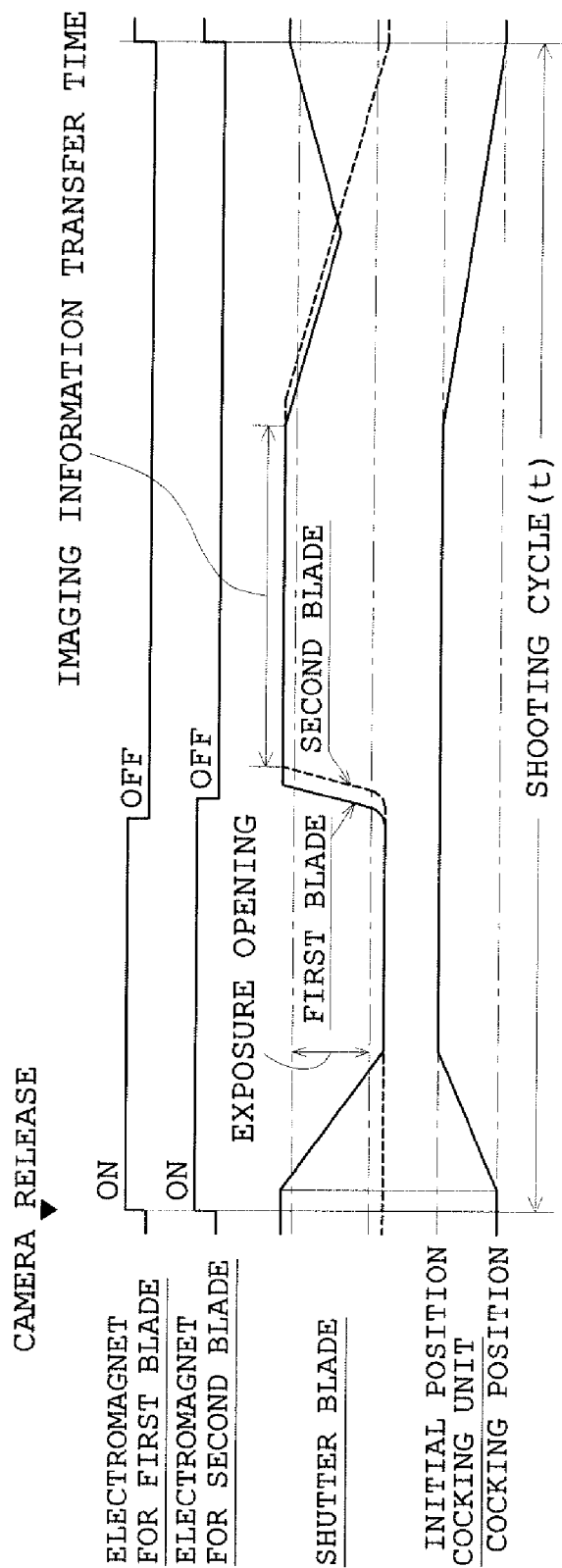
FIG. 23 is an explanatory view showing an operation sequence of each main unit when a press of the release button of the camera after the completion of the cocking operation of a conventional focal plane shutter for cameras in the prior art, the exposure operation of the focal plane shutter, and then the cocking operation of the focal plane shutter are performed, in the normally open method.

When the exposure operations of the first and second blades are complete in shooting and then the focal plane shutter reaches such a state of the focal plane shutter which is shown in FIG. 2, imaging information is immediately transferred from the image sensor to the storage device via an information-processing circuit. And, a control circuit provided for a camera is set a set length of time during which imaging information can be transferred to the storage device, in advance. And, in the conventional cases, the cocking unit is made to start to perform its cocking operation in its initial position after time during which imaging information can be transferred to the storage means passes by, as shown in FIG. 23. It is because conventional focal plane shutters operated in the normally open method are formed in such a way that their second blades are made to completely stay away from the opening 1a but their first blades are made not to completely cover the opening 1a due to the cocking operation, so that, if the cocking operation is started in the middle of time during which imaging information can be transferred to a storage device, light meets an image sensor during the transfer of the imaging information, and smear occurs and disturbs the imaging information.

However, as shown in FIG. 11, the focal plane shutter of the present embodiment is formed in such a way that: the second blade remains covering the opening 1a even though the cocking unit 15 is made to start to perform its cocking operation in the middle of time during which imaging information can be transferred to the storage device, so that light does not meet the image sensor; and the second blade is made to open the opening 1a just before the completion of the cocking operation of the cocking unit after time during which the imaging information can be transferred to the storage device passes by, so that the opening 1a is fully opened, in shooting performed in the normally open method. Also, as shown in FIG. 19, the focal plane shutter of the present embodiment is formed in such a way that: the second blade remains covering the opening 1a even though the cocking unit 15 is made to start to perform its cocking operation in the middle of time during which imaging information can be transferred to the storage device, so that light does not meet the imaging sensor; and the second blade is made to open the opening 1a just before the completion of the cocking operation of the cocking unit with the first blade completely covering the exposure opening after time during which the imaging information can be transferred to the storage device passes by, so that the opening 1a is fully opened, in shooting performed in the normally closed method. Accordingly, a series of shooting cycles (T) in the present embodiment, which corresponds to the length of time from the time a release button of a camera is pressed in shooting to the time the shooting is complete and the focal plane shutter reaches a state of the focal plane shutter being on standby for next shooting, is considerably shorter than a series of shooting cycle (t) in the conventional focal plane shutter which is shown in FIG. 23, both in shooting performed in the normally open method and in shooting performed in the normally closed method, so that next shooting can be early performed in the focal plane shutter of the present embodiment.

Next, it is concretely explained below that the focal plane shutter of the present embodiment can favorably operate in such a manner.

When the exposure operation is complete and the focal plane shutter of the present embodiment reaches a state of the focal plane shutter which is shown in FIG. 2, the cocking operation of the focal plane shutter immediately starts in the present embodiment, as described above. And, the cocking operation is performed in such a way that the camera body-side unit which is not shown in the drawings pushes the pushed part 15a of the cocking unit 15 downward, so that the cocking unit 15 is rotated in the counterclockwise direction against the elastic force of a return spring which is not shown in the drawings.

In the focal plane shutter for cameras of the present embodiment, it is possible to select a shooting mode with the normally open method or a shooting mode with the normally closed method by operating a selection device provided with a camera and not shown in the drawings before shooting, to perform shooting. Also, in the focal plane shutter for cameras of the present embodiment, it is possible to select not only a shooting mode in which an exposure operation is performed with the first and second blades but also a shooting mode in which an exposure operation is performed with the second blade and an electronic shutter instead of the first blade, by operating the above-described selection device, the electronic shutter being an image sensor.

Accordingly, in an explanation about operations of the focal plane shutter of the present embodiment, an operation of the focal plane shutter in the shooting mode in which an exposure operation is performed in the normally open method, an operation of the focal plane shutter in the shooting mode in which an exposure operation is performed with the first and second blades in the normally closed method, and an operation of the focal plane shutter in shooting mode in which an exposure operation is performed with the electrical shutter of the image sensor and the second blade are explained in that order.

Now, an operation of the focal plane shutter in the shooting mode in the normally open method is first explained using the plane views of FIGS. 2 to 10 showing stages of the operation of the focal plane shutter respectively and the timing chart of FIG. 11 showing the relations between the operations of the main components of the focal plane shutter, the shooting mode in the normally open method being a shooting mode in which: the focal plane shutter is regarded as in its initial position (or in a standby state for shooting) when the shutter blades fully open the exposure opening; the shutter blades do not immediately operate even though the release button is pressed in shooting; and the shutter blades start to operate in the initial position at the final stage of the shooting.

Because the shooting mode in the normally open method for the focal plane shutter of the present embodiment is a shooting mode in which an electric finder is used for shooting, a movable mirror not shown in the drawings moves up to be in an "up"-state when a camera is provided with the movable mirror. Also, in a state of the focal plane shutter just after an exposure operation of the focal plane shutter is complete, which is shown in FIG. 2, the supply of current to the coil 16d is cut off while the lateral portion of the prevention element 16b is meeting the side edge $16c$-$2_2$ of the window 16c-2. The prevention element 16b is in a trajectory of the operation of the prevention part 8a of the first blade-driving first unit 8 and reaches to the upper end portion of the arc-shaped elongate hole 1b, and the front surface of the prevention element 16b comes into contact with the surface of the prevention parts 8a of the first blade-driving first unit 8 while the first blade-driving first unit 8 is coming into contact with the buffer component 4. As a result, the focal plane shutter is in a state in which a rotation of the first blade-driving first unit 8 making the first blade close the exposure opening is prevented.

In the shooting mode in the normally open method, a coking operation of the focal plane shutter immediately starts in the state of the focal plane shutter just after the completion of the exposure operation of the focal plane shutter which is shown in FIG. 2. When the coking unit 15 starts to rotate, the pushing part 15b of the cocking unit 15 pushes the pushed part 9a of the first blade-driving second unit 9, so that the first blade-driving second unit 9 is made to start to rotate in the clockwise direction against the elastic force of the first blade-driving spring which is not shown in the drawings. At this point, force rotating the first blade-driving first unit 8 through the first blade in the clockwise direction is applied to the first blade-driving first unit 8 by the cocking spring not shown in the drawings. However, the contact between the front surface of the prevention element 16b and the prevention part 8a of the first blade-driving first unit 8 in the position shown in FIG. 2 prevents the first blade-driving first unit 8 form rotating in the clockwise direction, so that the first blade-driving first unit 8 is stopped.

At almost the same time as the pushing part 15b of the cocking unit 15 pushes the pushed part 9a of the first blade-driving second unit 9, the other pushing part 15c of the cocking unit 15 pushes the roller 13 fitted to the second blade-driving second unit 12 to make the second blade-driving second unit 12 start to rotate in the clockwise direction against the elastic force of the second blade-driving spring not shown in the drawings. Such a state of the focal plane shutter is shown in FIG. 3.

Figure 3:
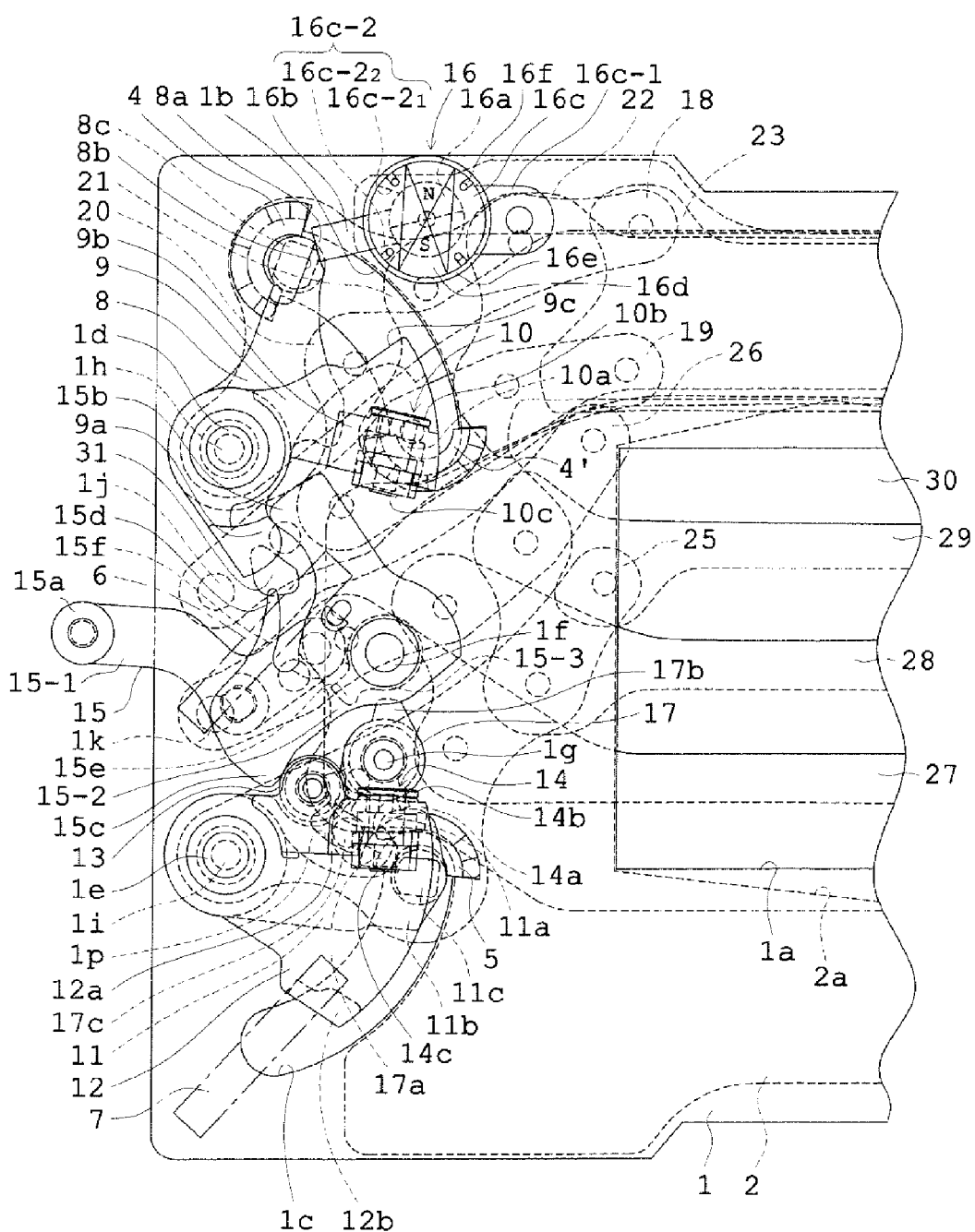
FIG. 3 is a plane view showing a state in which a first blade is kept staying away from an exposure opening while a second blade covers the exposure opening at the initial stage of a cocking operation of the focal plane shutter which starts in the state of the focal plane shutter shown in FIG. 2.

Even after the focal plane shutter reaches to the state of the focal plane shutter which is shown in FIG. 3, the cocking unit 15 continues to rotate in the counterclockwise direction, so that the roller 13 is pushed by the pushing part 15c and the second blade-driving second unit 12 is rotated in the clockwise direction against the elastic force of the second blade-driving spring which is not shown in the drawings. On the other hand, the engaging part 17a of the locking unit 17 engages with the engaged part 11a of the second blade-driving first unit 11 so that the second blade-driving first unit 11 is locked in the locking unit 17. As a result, the second blade-driving first unit 11 cannot be rotated in the clockwise direction by the elastic force of the second blade-cocking spring not shown in the drawings with the pushed part 11b following the pushing part 12b of the second blade-driving second unit 12, until the engaged part 11a is released from the engagement with the engaging part 17a by the pushing part 15e of the cocking unit 15 pushing the pushed part 17b of the locking unit 17 to rotate the locking unit 17 in the clockwise direction against the elastic force of the spring not shown in the drawings. As a result, only the second blade-driving second unit 12 continues to rotate in the clockwise direction with the four plate blades 27 to 30 for the second blade remaining covering the opening 1a.

Afterward, the iron parts 10c and 14c of the iron piece elements 10 and 14 which are fitted to the first blade-driving and second blade-driving second units 9 and 12 respectively meet the magnetic poles of the iron core elements 6 and 7 of the electromagnets for the first and second blades respectively, one after the other. And, the transfer of the imaging information to the storage device has been already complete around this point. Also, when the iron parts 10c and 14c of the iron piece elements 10 and 14 meet the magnetic poles of the iron core elements 6 and 7 respectively, the pushing part 15e of the cocking unit 15 pushes the pushed part 17b of the locking unit 17, so that the locking unit 17 is rotated in the clockwise direction against the elastic force of the spring which is not shown in the drawings. As a result, the engaged part 11a of the second blade-driving first unit 11 is released from the engagement with the engaging part 17a of the locking unit 17.

Figure 4:
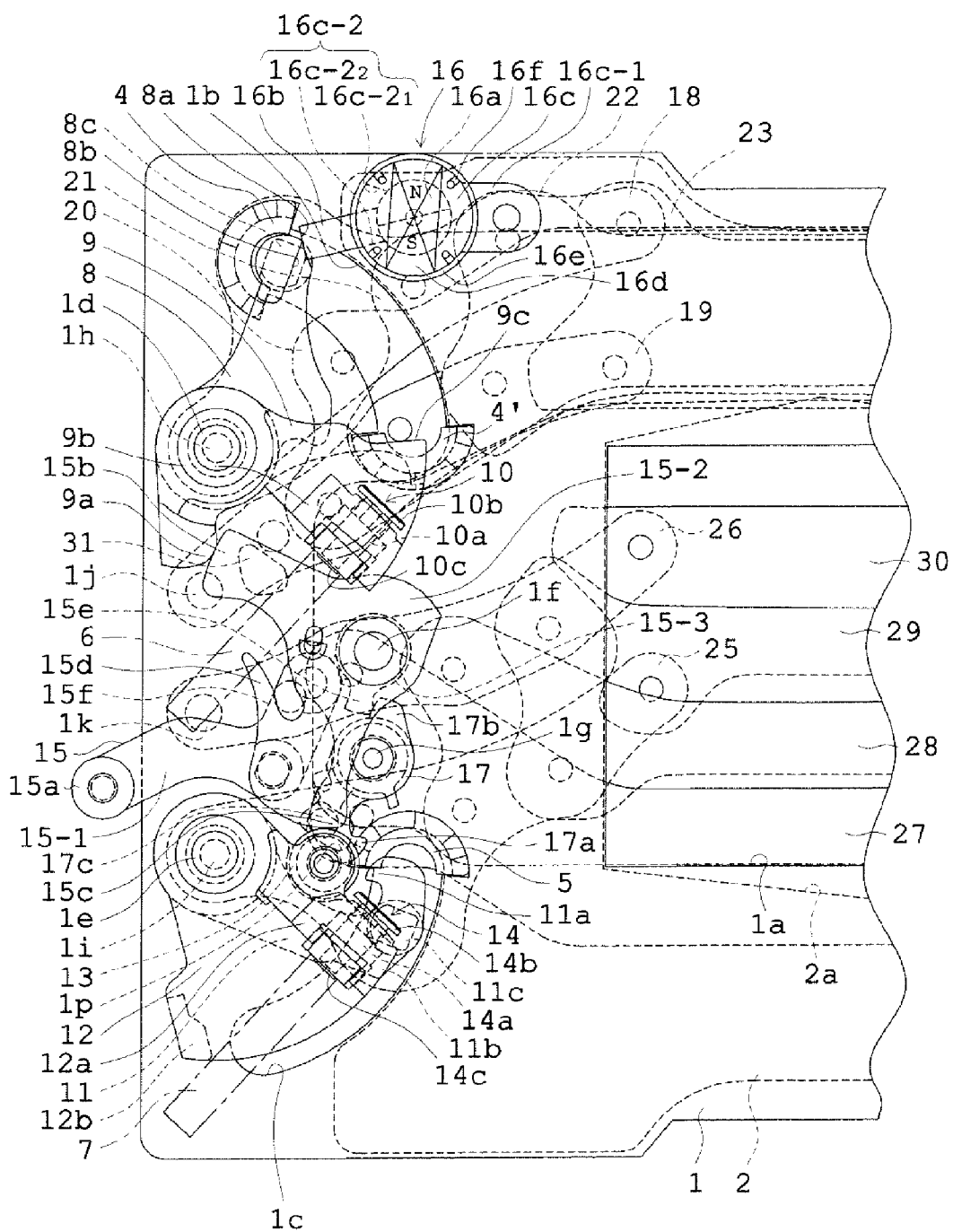
FIG. 4 is a plane view showing a state in which the cocking operation progresses more than in FIG. 3, the second blade-driving first unit is released from the engagement with the locking unit, and the second blade is in the middle of beginning to open the exposure opening.

The cocking unit 15 is stopped after the cocking unit 15 is slightly rotated afterward. In that process, the iron parts 10c and 14c of the iron piece elements 10 and 14 are pushed into the fitting parts 9b and 12a against the elastic forces of the compression springs which are not shown in the drawings, respectively. As a result, a part of each of the shafts 10a and 14a appears on the opposite side, so that the head parts 10b and 14b separate from the fitting parts 9b and 12a, respectively. Also, when the second blade-driving first unit 11 is released from the engagement with the locking unit 17, the second blade-driving first unit 11 is rotated in the clockwise direction by the elastic force of the second blade-cocking spring not shown in the drawings. As a result, the four plate blades 27 to 30 for the second blade move downward while amounts of the overlaps between adjacent plate blades of the four plate blades 27 to 30 are increasing, so that the opening 1a is opened. FIG. 4 shows a process in which the four plate blades 27 to 30 for the second blade open the opening 1a in such a manner.

Figure 5:
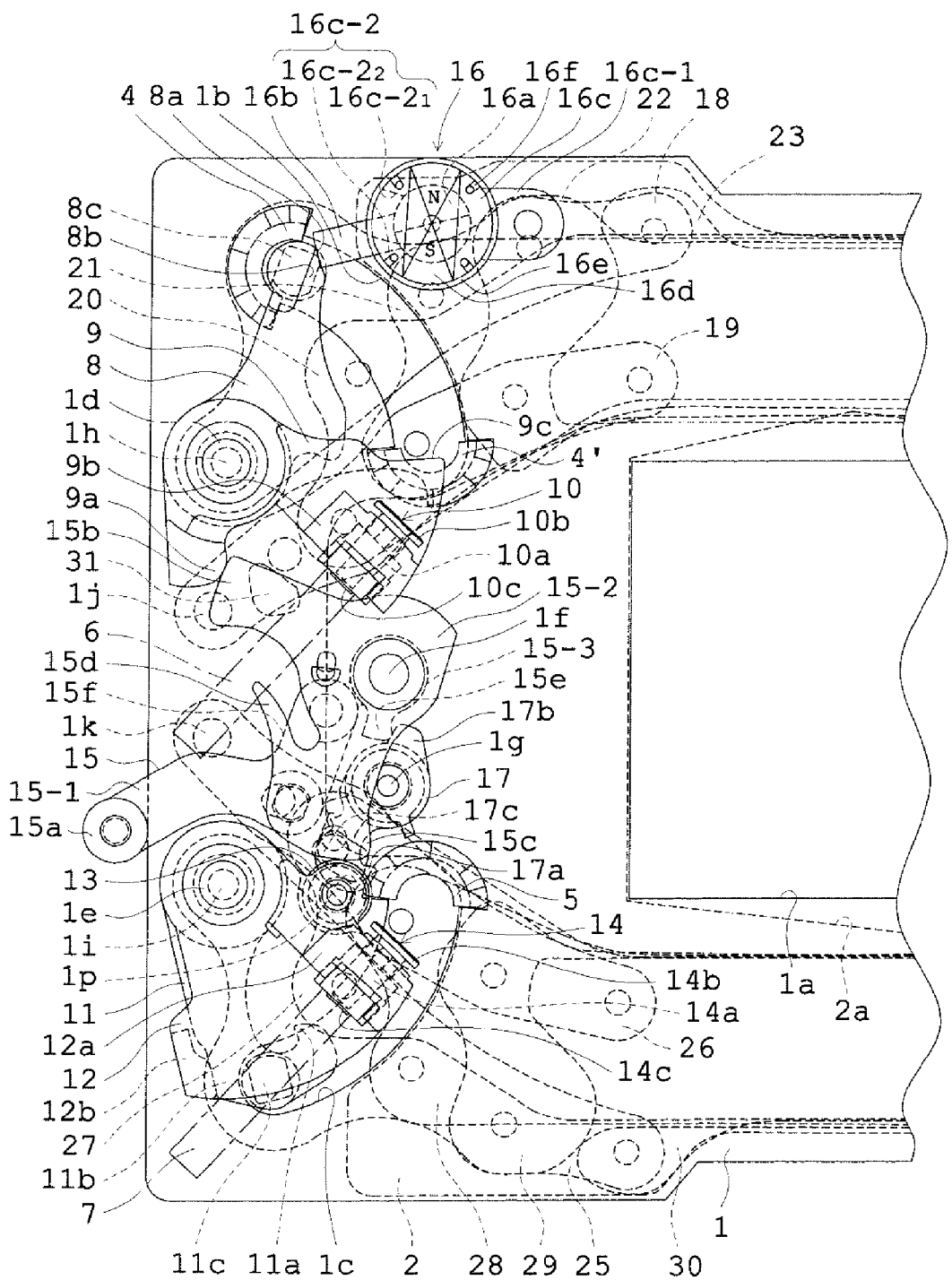
FIG. 5 is a plane view showing a state in which the cocking operation in the normally open method or in the normally closed method with an electronic shutter instead of the first blade is complete and the exposure opening is fully opened.

When the cocking unit 15 is stopped in its cocking position in such a manner, the pushed part 11b of the second blade-driving first unit 11 meets the pushing part 12b of the second blade-driving second unit 12, so that the second blade-driving first unit 11 is also stopped, and the opening 1a is fully opened. That state is shown in FIG. 5 and is a state in which the cocking operation of the focal plane shutter is complete, or a state in which the focal plane shutter is on standby for next shooting. The camera body-side unit makes the cocking unit 15 maintain this state shown in FIG. 5 against the elastic force of the return spring until next shooting, the return spring not being shown in the drawings. Accordingly, because the opening 1a is fully opened in this state shown in FIG. 5, the image of an object can be observed through an electronic view finder if the power supply of a camera is not cut off.

Besides, the focal plane shutter of the present embodiment is formed as a direct-type focal plane shutter. However, also in the case where the focal plane shutter of the present embodiment is formed as a locking-type focal plane shutter, there is necessity that the cocking unit 15 is made not to return to its initial position immediately after the completion of the cocking operation of the focal plane shutter but made to remain in its cocking position as in the present embodiment. As can be seen from the below explanation, it is because the four plate blades 20 to 23 for the first blade start to move and then inevitably cover the opening 1a if the cocking unit 15 returns to its initial position, so that the image of the object cannot be observed through the electronic view finder in advance of next shooting.

Figure 6:
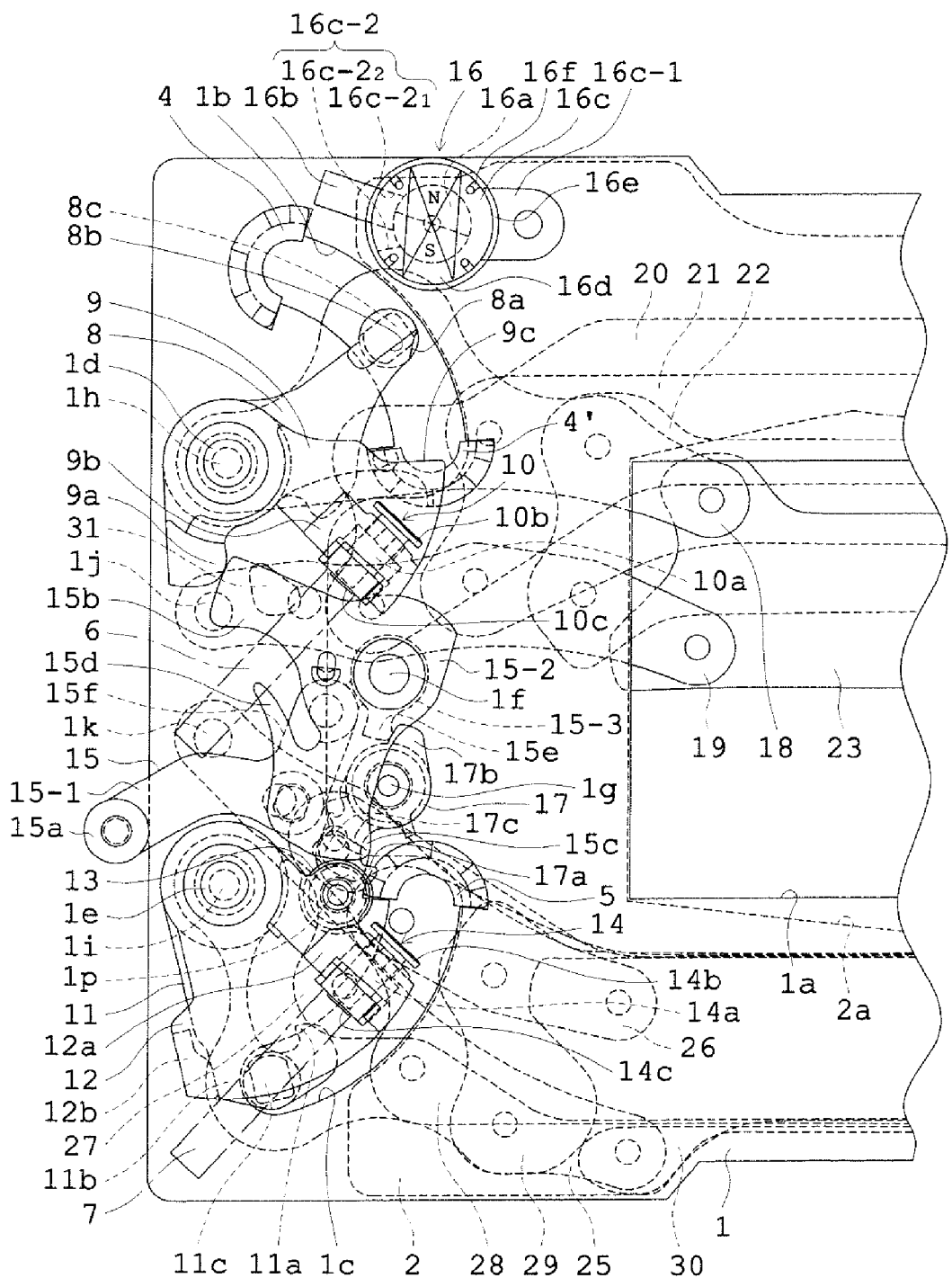
FIG. 6 is a plane view showing a state in which the first blade-driving first unit is released from the engagement with the locking unit and the first blade is in the middle of moving to a position in which the first blade starts its exposure operation, prior to an exposure operation of the focal plane shutter after a release button of a camera is pressed from the state shown in FIG. 5, in shooting performed in the normally open method.

Next, the case where next shooting is performed in such a cocking-completion state of the focal plane shutter is explained. When a release button of a camera is pressed in the state of the focal plane shutter shown in FIG. 5 while the image of an object is being observed through the electronic view finder, the electromagnets for the first and second blades are magnetized ("ON" in FIG. 11) before the start of actual shooting (exposure operation), so that the iron piece elements 10 and 14 are attracted by the iron core elements 6 and 7 to be held, respectively. Also, At this point, the coil 16d of the prevention unit 16 is electrified in the forward direction. The permanent magnetic rotator 16a is rotated in the clockwise direction in FIG. 5, and the prevention element 16b moves to the outside of the trajectory of the operation of the pushed part 8a of the first blade-driving first unit 8, so that the front surface of the prevention element 16b separates from the prevention part 8a of the first blade-driving first unit 8. And then, the lateral portion of the prevention element 16b meets the side edge 16c-2₁ of the window 16c-2, so that the permanent magnetic rotator 16a is stopped. Afterward, the supply of current to the coil 16d of the prevention unit 16 is cut off, so that the focal plane shutter is in a state in which the rotation of the first blade-driving first unit 8 making the first blade close the exposure opening is released from the prevention unit 16. And, the first blade-driving first unit 8 is rotated clockwise by the elastic force of the first blade-driving spring not shown in the drawings. As a result, the four plate blades 20 to 23 for the first blade cover the opening 1a while amounts of the overlaps between adjacent plate blades of the four plate blades 20 to 23 are decreasing. FIG. 6 shows a state in which the four plate blades 20 to 23 for the first blade cover half or more of the opening 1a in such a manner.

When the first blade-driving first unit 8 is rotated in the clockwise direction more from the state of the first blade-driving first unit 8 shown in FIG. 6 and the four plate blades 20 to 23 for the first blade completely cover the exposure opening 1a, the pushed part 8b of the first blade-driving first unit 8 meets the pushing part 9c of the first blade-driving second unit 9 and the driving pin 8c meets the buffer component 4', so that the first blade-driving first unit 8 is stopped.

Next, the camera body-side unit which is not shown in the drawings releases the cocking unit 15 from the push of the pushed part 15a due to the camera body-side unit, so that the cocking unit 15 is rotated in the clockwise direction by the elastic force of the return spring which is not shown in the drawings, and the cocking unit 15 is made to return to its initial position.

At the initial stage of the operation of the cocking unit 15 returning to its initial position, the pushing part 15b of the cocking unit 15 separates from the pushed part 9a of the first blade-driving second unit 9 and the pushing part 15c of the cocking unit 15 separates from the roller 13 which is fitted to the second blade-driving second unit 12, so that the first blade-driving and second blade-driving second units 9 and 12 are rotated in the counterclockwise direction by the elastic forces of the first blade-driving and second blade-driving springs which are not shown in the drawings, respectively. However, because the iron piece elements 10 and 14 are attracted by the iron core elements 6 and 7 to be held respectively, the first blade-driving and second blade-driving second units 9 and 12 are rotated slightly, and then their fitting parts 9b and 12a meet the head parts 10b and 14b of the iron piece elements 10 and 14 respectively. As a result, the first blade-driving and second blade-driving second units 9 and 12 are stopped.

Such a slight rotation of the second blade-driving second unit 12 makes the pushing part 12b of the second blade-driving second unit 12 pushes the pushed part 11b of the second blade-driving first unit 11, so that the second blade-driving first unit 11 is also rotated slightly against the elastic force of the second blade-cocking spring not shown in the drawings. As a result, the four plate blades 27 to 30 for the second blade also move slightly upward but are stopped before the four plate blades 27 to 30 start to cover the opening 1a. The positions which the first blade-driving first unit 8, the first blade, the first blade-driving second unit 9, the second blade-driving first unit 11, the second blade, and the second blade-driving second unit 12 attain in such a manner respectively correspond to exposure operation-starting positions for them, respectively.

Figure 7:
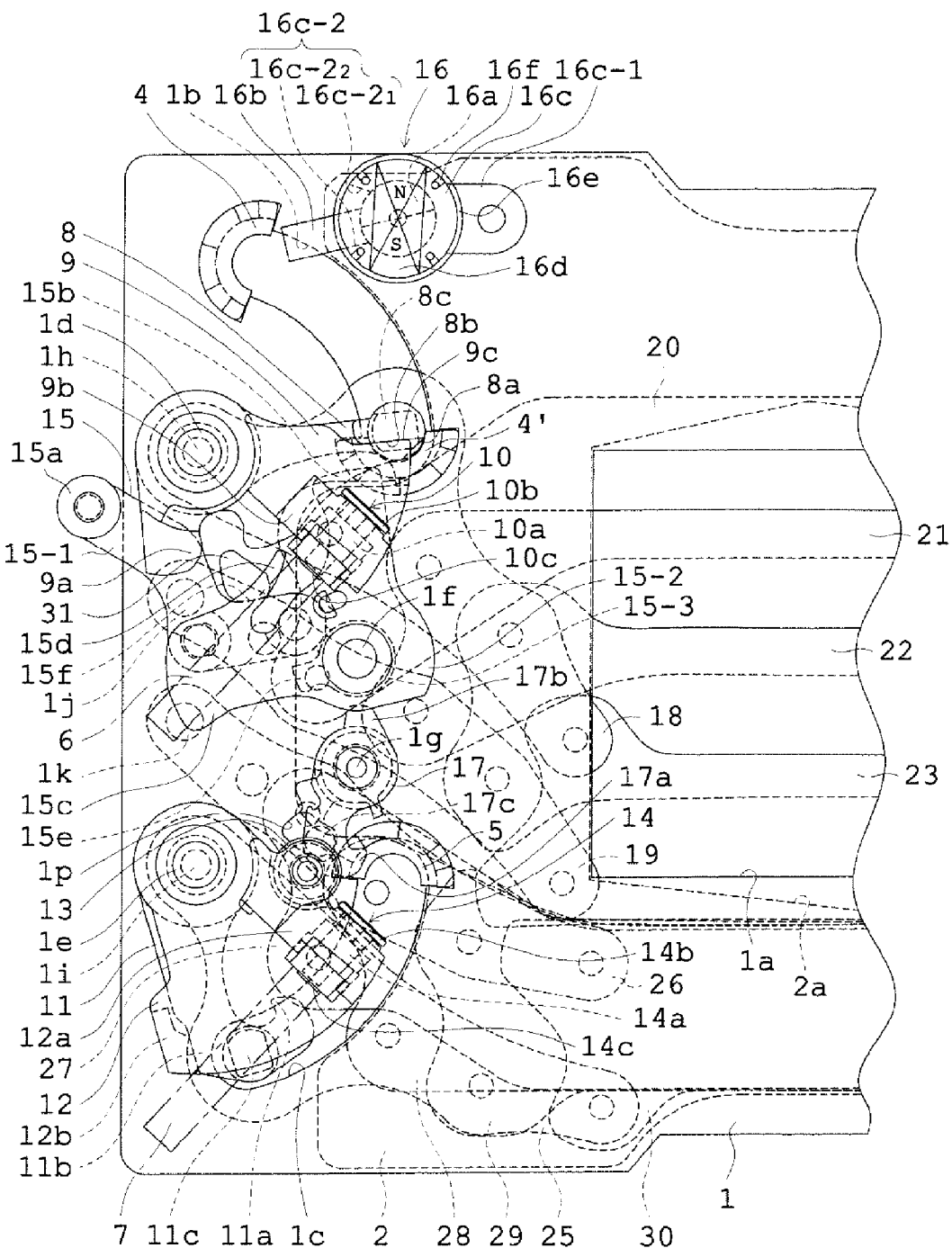
FIG. 7 is a plane view showing a state in which the first blade finishes moving to the position in which the first blade starts its exposure operation from the state shown in FIG. 6, the cocking unit returns to its initial position, and the prevention unit moves to a position in which the prevention unit prevents a rotation of the first blade-driving first unit, and which is a state of the focal plane shutter just before an exposure operation of the focal plane shutter starts.

Also, at approximately the same time as the cocking unit 15 returns from its cocking position to its initial position, the coil 16*d* of the prevention unit 16 is electrified in the reverse direction, so that the permanent magnetic rotator 16*a* is rotated in the counterclockwise direction in FIG. 6, and the prevention element 16*b* is in the trajectory of the operation of the prevention part 8*a* of the first blade-driving first unit 8 and reaches to the upper end portion of the arc-shaped elongate hole 1*b*. Afterward, the supply of current to the coil 16*d* of the prevention unit 16 is cut off. FIG. 7 shows a state of the focal plane shutter in which: the four plate blades 20 to 23 for the first blade completely cover the opening 1*a* in such a manner; and the prevention element 16*b* has moved into the trajectory of the operation of the prevention part 8*a* of the first blade-driving first unit 8.

After the cocking unit 15 returns to its initial position, the electromagnets for the first and second blades are demagnetized ("OFF" in FIG. 11) in turn at a predetermined time interval corresponding to the brightness of light from the object. So, when the electromagnet for the first blade is first demagnetized, the attraction of the iron core element 6 to the iron piece element 10 disappears, so that the first blade-driving second unit 9 is rapidly rotated in the counterclockwise direction by the elastic force of the first blade-driving spring which is not shown in the drawings. At this point, the pushing part 9*c* of the first blade-driving second unit 9 pushes the pushed part 8*b* of the first blade-driving first unit 8, so that the first blade-driving second unit 9 rotates the first blade-driving first unit 8 in the counterclockwise direction against the elastic force of the first blade-cocking spring not shown in the drawings. As a result, the four plate blades 20 to 23 for the first blade move upward while amounts of the overlaps between adjacent plate blades of the four plate blades 20 to 23 are increasing, so that the opening 1*a* is opened through the lower edge of the slit-forming plate blade 23.

Figure 8:
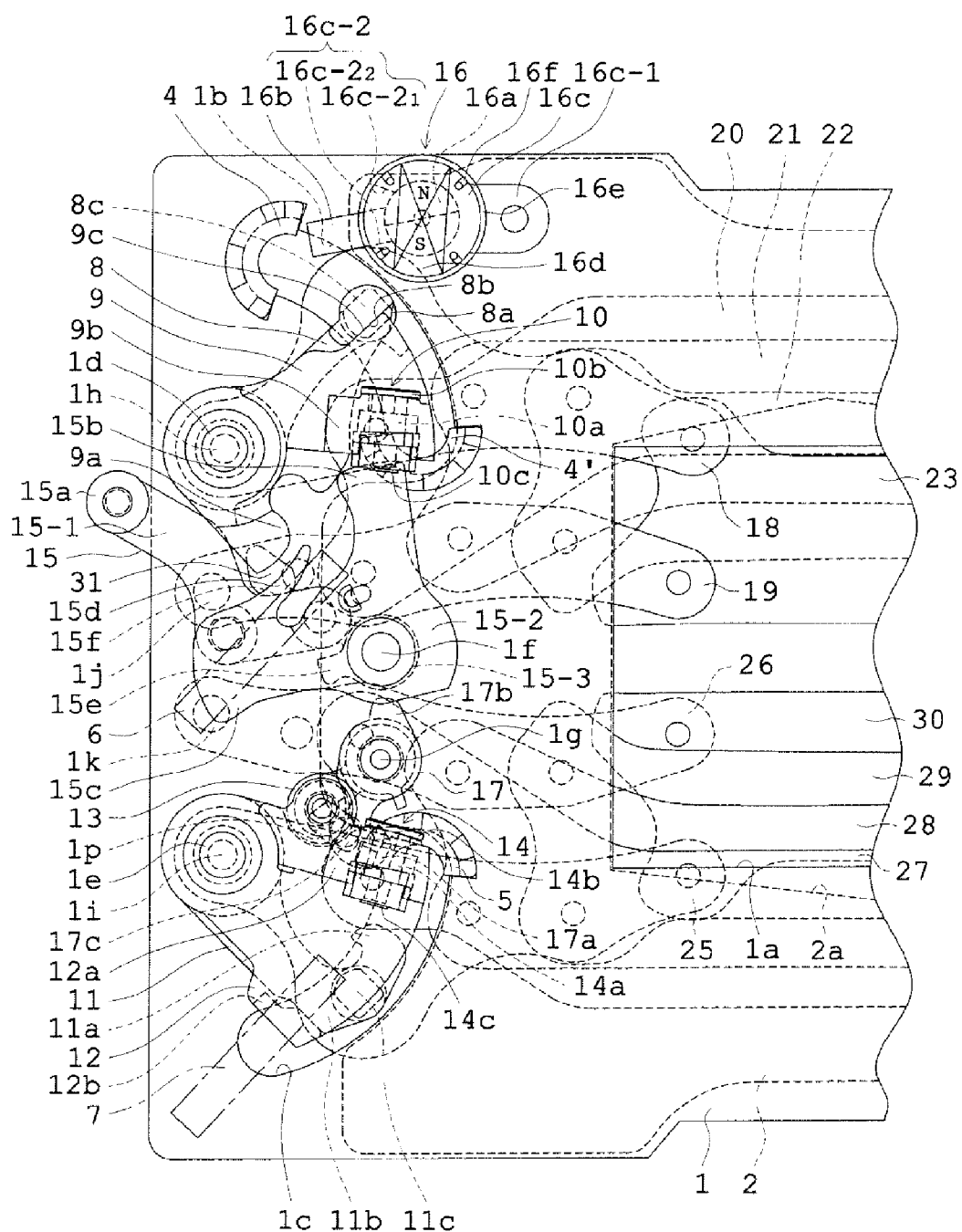
FIG. 8 is a plane view showing a state of the focal plane shutter after the first and second blades start their exposure operations respectively from the state shown in FIG. 7.

When the electromagnet for the second blade is demagnetized after the predetermined time passes by since the electromagnet for the first blade was demagnetized, the attraction of the iron core element 7 to the iron piece element 14 disappears, so that the second blade-driving second unit 12 is rapidly rotated in the counterclockwise direction by the elastic force of the second blade-driving spring which is not shown in the drawings. At this point, the pushing part 12*b* of the second blade-driving second unit 12 pushes the pushed part 11*b* of the second blade-driving first unit 11, so that the second blade-driving second unit 12 rotates the second blade-driving first unit 11 in the counterclockwise direction against the elastic force of the second blade-cocking spring. As a result, the four plate blades 27 to 30 for the second blade move upward while amounts of the overlaps between adjacent plate blades of the four plate blades 27 to 30 are decreasing, so that the opening 1*a* is closed through the upper edge of the slit-forming plate blade 30. As a result, afterward, the image plane of the image sensor is exposed from the lower side of the image plane to the upper side of the image plane continuously by a slit which is formed between the slit-forming plate blades 23 and 30 of the first and second blades. FIG. 8 shows a state of the focal plane shutter in which the focal plane shutter is in the middle of such an exposure operation.

Figure 9:
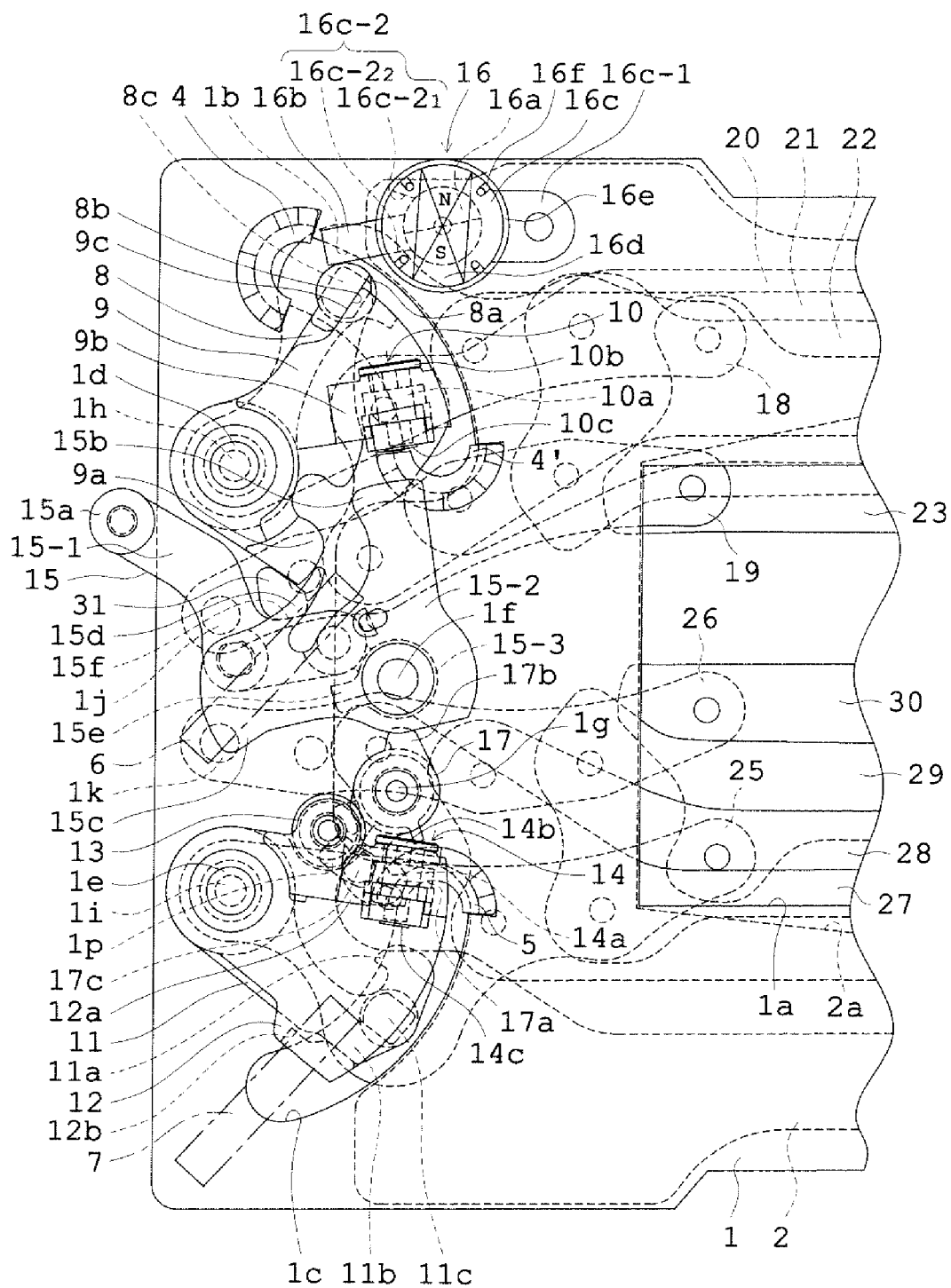
FIG. 9 is a plane view showing a state in which the prevention unit brakes the first blade-driving first unit while the first and second blades are in the middle of performing their respective exposure operations from the state shown in FIG. 8.

At the final stage of the exposure operation of the focal plane shutter performed in such a manner, the driving pin 8*c* of the first blade-driving first unit 8 that is pushed by the first blade-driving second unit 9 first comes into contact with the lateral portion of the prevention element 16*b*. As a result, the first blade-driving second unit 8 is braked by the prevention element 16*b*. FIG. 9 shows the state of the focal plane shutter in which the first blade-driving first unit 8 is braked in such a manner.

In addition, the driving pin 8*c* of the first blade-driving first unit 8 which is pushed by the first blade-driving second unit 9 rotates the permanent magnetic rotator 16*a* clockwise against the rotation force of the permanent magnetic rotator 16*a*, with the driving pin 8*c* of the first blade-driving first unit 8 coming into contact with the lateral portion of the prevention element 16*b* to be braked. At this point, although the prevention element 16*b* is made to move to the outside of the trajectory of the operation of the prevention part 8*a* of the first blade-driving first unit 8 because the prevention element 16*b* is rotated clockwise with the driving pin 8*c* of the first blade-driving first unit 8 coming into contact with the lateral portion of the prevention element 16*b*, the force that rotates the permanent magnetic rotator 16*a* counterclockwise is maintained.

Also, at approximately the same time as this operation, the pushed part 9*a* of the first blade-driving second unit 9 comes into contact with the braking part 15*d* of the cocking unit 15, so that the first blade-driving second unit 9 is braked while the first blade-driving second unit 9 is bending the braking part 15*d*. And then, the engaged part 11*a* of the second blade-driving first unit 11 meets the engagement part 17*a* of the locking unit 17, so that the second blade-driving second unit 12 is braked while rotating the locking unit 17 in the clockwise direction against the elastic force of the spring which is not shown in the drawings.

Figure 10:
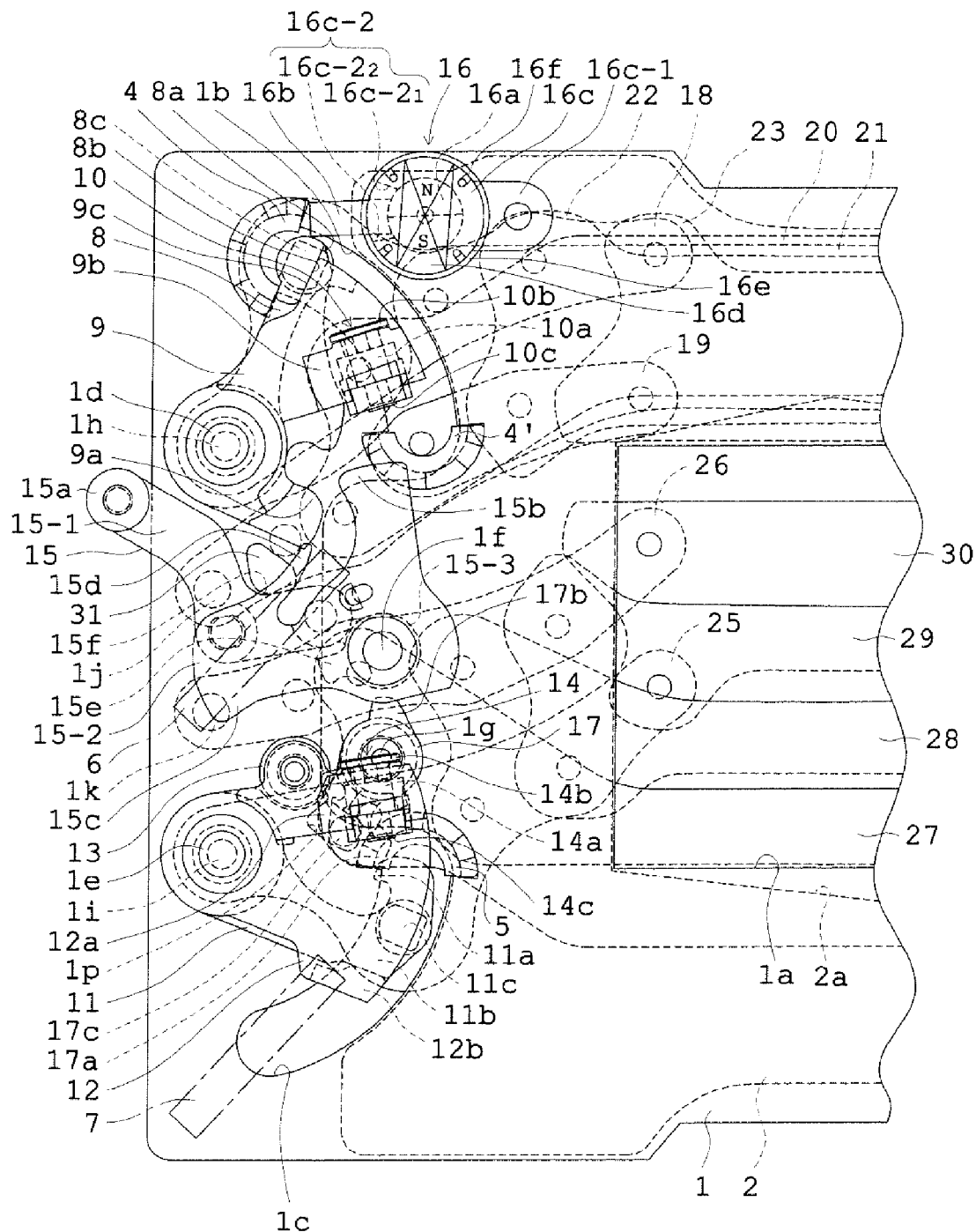
FIG. 10 is a plane view showing a state in which the prevention unit and the cocking unit brake the first blade-driving first unit just before the exposure operations of the first and second blades are complete, from the state shown in FIG. 9.

FIG. 10 shows the state of the focal plane shutter in which: the first blade-driving second unit 9 is in the final stage of such a rotation of the first blade-driving second unit 9 braked by the braking part 15*d*; and the engaged part 11*a* is made to meet the engagement part 17*a* of the locking unit 17 so that the second blade-driving second unit 12 is braked in such a manner.

And, the pushed part 9*a* of the first blade-driving second unit 9 separates from the braking part 15*d* of the cocking unit 15 just after the state of the focal plane shutter which is shown in FIG. 10, and the driving pin 8*c* of the first blade-driving first unit 8 meets the buffer component 4 afterward, so that the two first blade-driving units 8 and 9 and the first blade are stopped. At this point, the driving pin 8*c* of the first blade-driving first unit 8 separates from the lateral portion of the prevention element 16*b*, so that the permanent magnetic rotator 16*a* is rotated counterclockwise by the rotation force applied to the permanent magnetic rotator 16*a*, and the lateral portion of the prevention element 16*b* meets the side edge 16*c*-2$_2$ of the window 16*c*-2, so that the permanent magnetic rotator 16*a* is stopped. At this point, the front surface of the prevention parts 16*b* comes into contact with the surface of the pushed part 8*a* of the first blade-driving first unit 8. As a result, a bounce of the first blade-driving first unit 8 is stopped, and the focal plane shutter reaches to a state in which the rotation of the first blade-driving first unit 8 making the first blade close the exposure opening is prevented.

Next, when the engaged part 11*a* of the second blade-driving first unit 11 that is braked by the locking unit 17 up to now pushes the engagement part 17*a* of the locking unit 17 to rotate the locking unit 17 clockwise and then the locking unit 17 reaches a state in which the locking unit 17 can rotate in the counterclockwise direction by the elastic force of the spring not shown in the drawings, the driving pin 11c of the second blade-driving first unit 11 meets the buffer component 5, so that the two second blade-driving units 11 and 12 and the second blade are stopped. Also, a counterclockwise rotation of the locking unit 17 makes the engagement part 17a of the locking unit 17 engage with the engaged part 11a of the second blade-driving first unit 11. As a result, a bounce of the second blade-driving first unit 11 is stopped, and the exposure operation of the focal plane shutter is complete. FIG. 2 shows such a state of the focal plane shutter.

Now, the primary role of the locking unit 17 in the present embodiment is to lock the second blade-driving first unit 11 so that the four plate blades 27 to 30 for the second blade cover the opening 1a from the time the cocking operation of the focal plane shutter starts to the time the transfer of imaging information from an image sensor is complete. Accordingly, a locking unit for the present invention is not necessarily formed in the manner according to the present embodiment and may be formed in such a way that: the locking unit does not come into contact with the second blade-driving first unit 11 before the second blade-driving first unit 11 completely stops in the above-described manner; and, for example, the second blade-driving first unit 11 engages with and is locked by a camera body-side unit after the second blade-driving first unit 11 completely stops, so as to prevent the second blade-driving first unit 11 from rotating in the clockwise direction. However, in the present embodiment, the locking unit 17 is formed in the above-described manner in order not to provide the focal plane shutter of the present embodiment with a special braking unit, and the locking unit 17 also plays a role as a unit braking the rotations of the two second blade-driving units 11 and 12 at the final stage of the exposure operation.

Also, when the exposure operation is complete, the driving pin 11c meets the buffer component 5, so that the second blade-driving first unit 11 might inevitably bounce. As a result, the upper edge of the slit-forming plate blade 30 for the second blade moves onto the opening 1a temporarily, so that there is fear that the image sensor might be exposed again. In such a case, conventional focal plane shutters are provided with a unit which prevents the bounce of such a blade-driving unit, solely. Alternatively, the unit which prevents the bounce of such a blade-driving unit is used also as a braking unit in conventional focal plane shutters. However, in the present embodiment, even though the second blade-driving first unit 11 bounces, the engagement part 17a of the locking unit 17 engages with the engaged part 11a of the second blade-driving first unit 11 so that the first blade-driving first unit 11 is locked by the locking unit 17. As a result, there is no necessity that the focal plane shutter of the present embodiment is specially provided with a unit for preventing the bounce of the second blade-driving first unit 11.

A state of the focal plane shutter of the present embodiment in which the two second blade-driving units 11 and 12 and the second blade are stopped in the above-described manner is a state of the focal plane shutter just after the completion of the exposure operation, this state of the focal plane shutter being shown in FIGS. 1 and 2. Afterward, when imaging information is transferred from the image sensor to the storage device via the information-processing circuit, the shooting is complete. In the present embodiment, the cocking operation is performed during the transfer of the imaging information, as explained already. As a result, the length of time from the time the first shooting is performed to the time the next shooting is performed becomes short in the present embodiment, and the focal plane shutter of the present embodiment is particularly advantageous for digital cameras with which continuous shooting can be performed.

Besides, as described above, the cocking operation of the focal plane shutter of the present embodiment is performed in such a way that the pushed part 15a is pressed directly by the camera body-side unit so that the cocking unit 15 is rotated against the elastic force of the return spring which is not shown in the drawings. However, focal plane shutters according to the present invention are not limited to such a constitution. Focal plane shutters according to the present invention may be formed in such a way that: another cocking unit which is different from the cocking unit 15 and which is operated by the camera body-side unit is fitted to the shutter base plate 1; and the cocking unit 15 is rotated by the another cocking unit, as known publically. In this case, the return spring for returning the cocking unit 15 to its initial position may be connected to the cocking unit 15 as in the present embodiment or may be connected to such another cocking unit.

Now, as explained already, focal plane shutters according to the present invention can be also embodied as locking-type focal plane shutters. However, the above-described focal plane shutter of the present embodiment is formed as a direct-type focal plane shutter. And, in the explanation of the present embodiment, it has been explained that, when the focal plane shutter is formed as a locking-type focal plane shutter, a focal plane shutter according to the present invention should be formed in such a way that a cocking unit is not immediately returned to its initial position after the completion of the cocking operation but is returned to its initial position before exposure operation is started in the initial stage of shooting, like the cocking unit for the present embodiment. Accordingly, it is considered that it is possible to sufficiently understand that focal plane shutters according to the present invention can be also embodied as a locking-type focal plane shutter, only with the explanation of the present embodiment. However, just to make sure, a constitution for forming the focal plane shutter of the present embodiment as a locking type focal plane shutter is explained shortly.

First, the iron piece elements 10 and 14 are not fitted to the first blade-driving and second blade-driving second units 9 and 12 respectively, unlike the present embodiment. Instead, each of the first blade-driving and second blade-driving second units 9 and 12 is provided with an engaged part. And, these first blade-driving and second blade-driving second units 9 and 12 are formed in such a way that: the first blade-driving and second blade-driving second units 9 and 12 are rotated more beyond their positions in which their engaged parts engage with and are locked by a locking unit respectively, in a state of the focal plane shutter in which the cocking operation of the focal plane shutter is complete and which is shown in FIG. 5; and as in the present embodiment, the engaged parts of these blade-driving second units 9 and 12 engage with and locked by the locking unit respectively at the initial stage of the process of returning the cocking unit 15 to its initial position by pressing a release button of a camera. And, afterward, the focal plane shutter formed as a locking type one is operated in the quite same manner as the focal plane shutter of the present embodiment is, until the cocking unit 15 returns to its initial position.

On the other hand, two lock-releasing units, which are provided for the focal plane shutter in order to release the engagements of the respective engaged parts with the locking unit, are attracted and held by the electromagnets for the first and second blades against the elastic forces of the respective springs before the cocking unit 15 starts to return to its initial position in the above-described manner. And, when the cocking unit 15 operates in the above-described manner afterward and returns to its initial position shown in FIG. 7, the supply of electric current to the electromagnet for the first blade and the supply of electric current to the electromagnet for the second blade are cut off in turn. As a result, the lock-releasing units are made to operate by the elastic forces of the respective springs respectively, so that the lock-releasing units release these blade-driving units 9 and 12 from the engagements of the engaged parts with the locking unit respectively. As a result, the first blade-driving second unit 9 and the second blade-driving second unit 12 start to perform their exposure operations in turn. And, in the cocking operation of the focal plane shutter, the two lock-releasing units are made to come into contact with the electromagnets respectively in response to the movement of the cocking unit 15. Besides, various kinds of constitutions for achieving such an operation of the focal plane shutter formed as a locking-type one are known publically, and one example of such constitutions is also disclosed in Japanese Patent Application Publication TOKUKAI No. 2001-215555.

Next, an operation of the focal plane shutter in the shooting mode in the normally closed method is explained using the plane views of FIGS. 12 to 18 showing stages of the operation of the focal plane shutter respectively and the timing chart of FIG. 19 showing the relations between the operations of the main components of the focal plane shutter, the shooting mode in the normally closed method being a shooting mode in which: the focal plane shutter is regarded as in its initial position (or in a standby state for shooting) when the shutter blades close the exposure opening; and the shutter blades immediately start to operate in the initial position when the release button is pressed in shooting.

Because the shooting mode in the normally closed method for the focal plane shutter of the present embodiment is a shooting mode in which an optical view finder is used for shooting, a movable mirror not shown in the drawings moves down to be in an "down"-state when a camera is provided with the movable mirror, so that the image of an object can be observed through the optical view finder. Also, the coil 16*d* of the prevention unit 16 is not electrified, and the permanent magnetic rotator 16*a* is kept in a state in which the lateral portion of the prevention element 16*b* meets the side edge 16*c*-2$_1$ of the window 16*c*-2. As a result, the focal plane shutter is kept in a state in which a rotation of the first blade-driving first unit 8 making the first blade close the exposure opening is not prevented.

Figure 12:
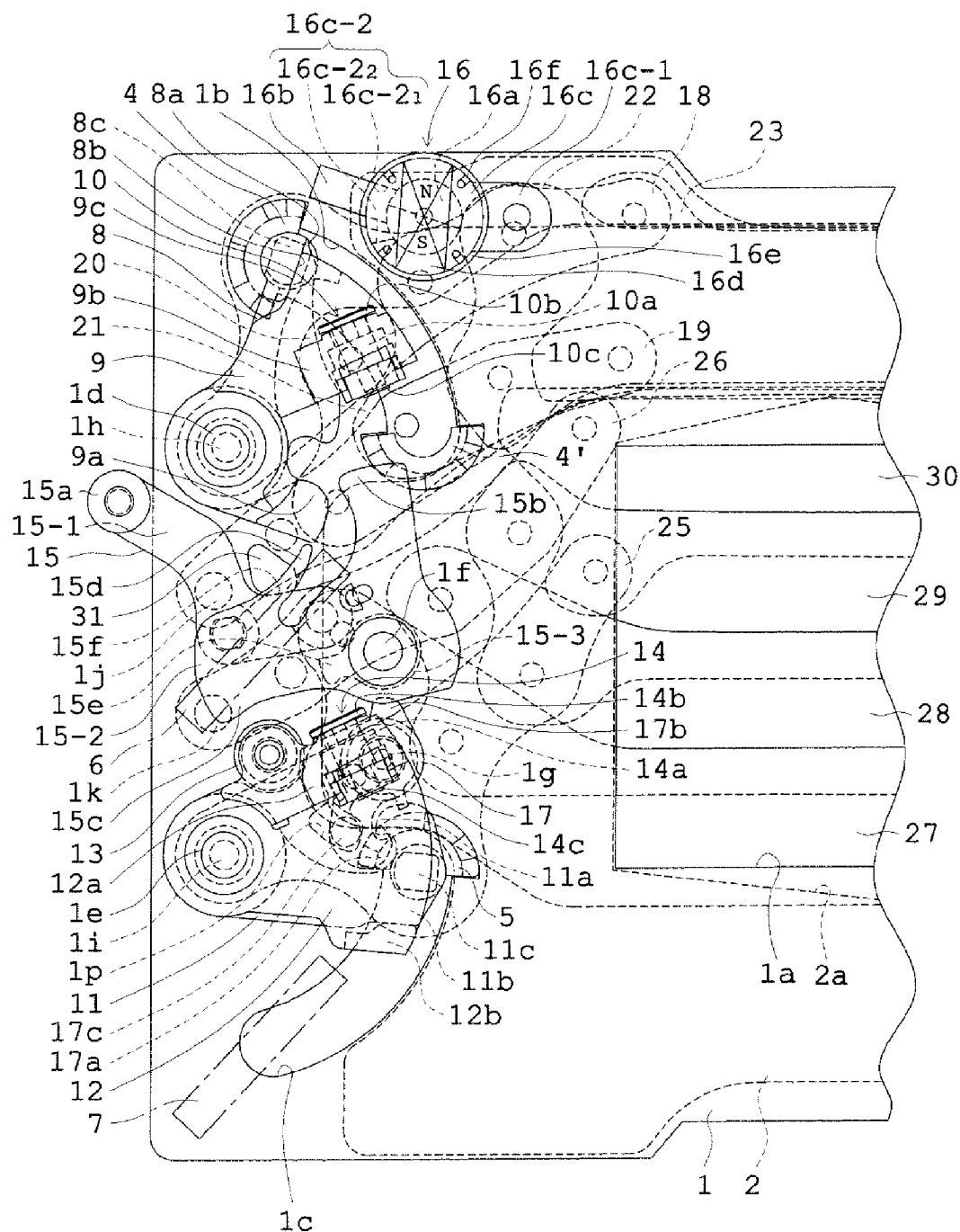
FIG. 12 is a plane view showing the approximately left-side half part of the focal plane shutter according to the present embodiment which is in a state just after an exposure operation of the focal plane shutter in the normally closed method is completion, while the approximately left-side half part is being enlarged.
Figure 13:
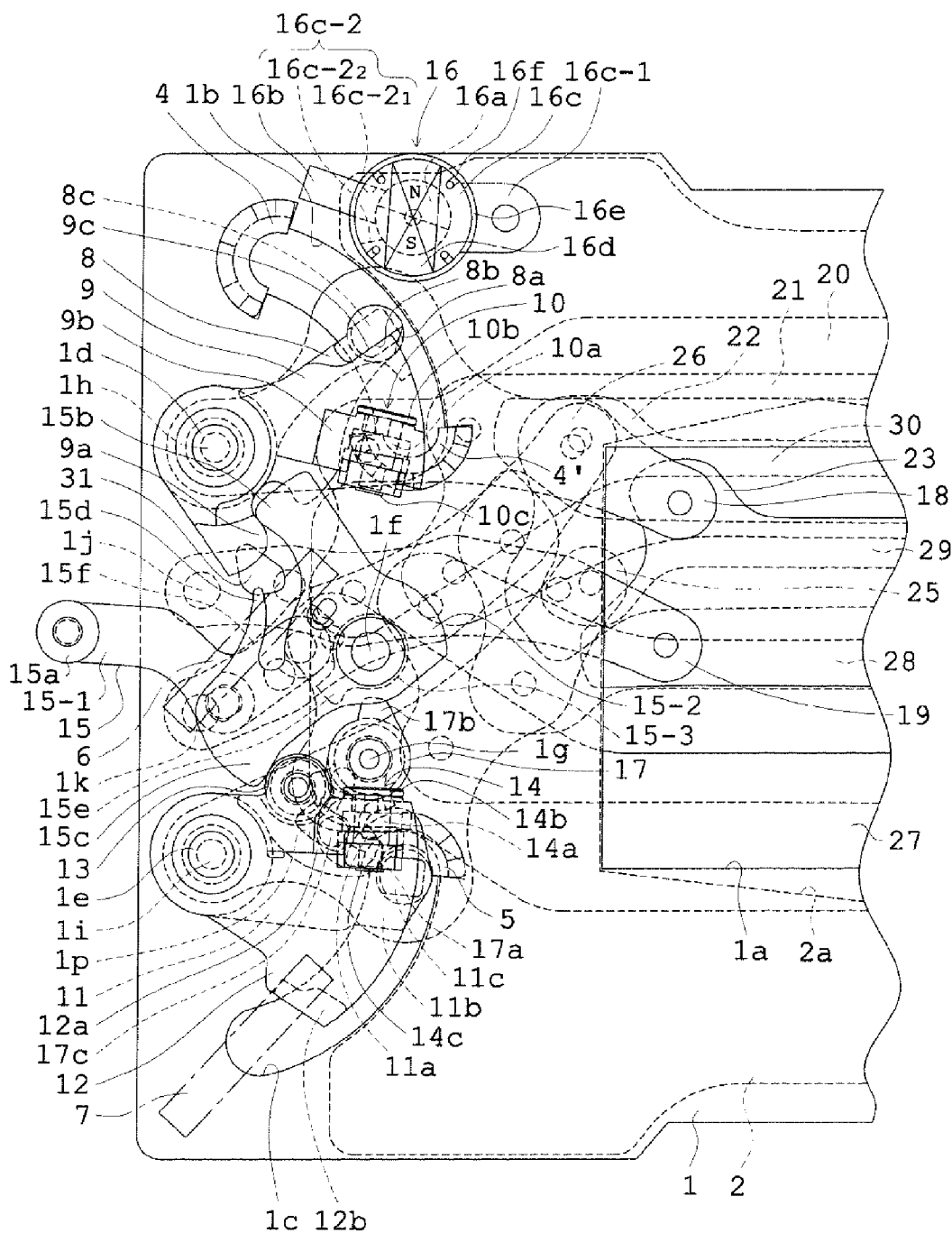
FIG. 13 is a plane view showing a state of the focal plane shutter for cameras of the present embodiment in which the first blade is in the middle of beginning to cover the exposure opening when the second blade covers the exposure opening at the initial stage of the cocking operation of the focal plane shutter which starts in the state of the focal plane shutter shown in FIG. 12 in the normally closed method.

When the coking unit 15 starts to rotate just after the completion of the exposure operation of the focal plane shutter which is shown in FIG. 12, the pushing part 15*b* of the cocking unit 15 pushes the pushed part 9*a* of the first blade-driving second unit 9, so that the first blade-driving second unit 9 is made to start to rotate in the clockwise direction against the elastic force of the first blade-driving spring which is not shown in the drawings. The first blade-driving first unit 8 is rotated clockwise by the elastic force of the first blade-cocking spring not shown in the drawings while the pushed part 8*b* is following the pushing part 9*c* of the first blade-driving second unit 9, so that the four plate blades 20 to 23 for the first blade cover the opening 1*a* while amounts of the overlaps between adjacent plate blades of the four plate blades 20 to 23 are decreasing. FIG. 13 shows a state in which the four plate blades 20 to 23 for the first blade cover half or more of the opening 1*a* in such a manner.

At almost the same time as the pushing part 15*b* of the cocking unit 15 pushes the pushed part 9*a* of the first blade-driving second unit 9, the other pushing part 15*c* of the cocking unit 15 pushes the roller 13 fitted to the second blade-driving second unit 12 to make the second blade-driving second unit 12 start to rotate in the clockwise direction against the elastic force of the second blade-driving spring not shown in the drawings. Such a state of the focal plane shutter is also shown in FIG. 13.

Even after the focal plane shutter reaches to the state of the focal plane shutter which is shown in FIG. 13, the cocking unit 15 continues to rotate in the counterclockwise direction, so that the roller 13 is pushed by the pushing part 15*c* and the second blade-driving second unit 12 is rotated in the clockwise direction against the elastic force of the second blade-driving spring which is not shown in the drawings. On the other hand, the engaging part 17*a* of the locking unit 17 engages with the engaged part 11*a* of the second blade-driving first unit 11 so that the second blade-driving first unit 11 is locked in the locking unit 17. As a result, the second blade-driving first unit 11 cannot be rotated in the clockwise direction by the elastic force of the second blade-cocking spring not shown in the drawings with the pushed part 11*b* following the pushing part 12*b* of the second blade-driving second unit 12, until the engaged part 11*a* is released from the engagement with the engaging part 17*a* by the pushing part 15*e* of the cocking unit 15 pushing the pushed part 17*b* of the locking unit 17 to rotate the locking unit 17 in the clockwise direction against the elastic force of the spring not shown in the drawings. As a result, only the second blade-driving second unit 12 continues to rotate in the clockwise direction with the four plate blades 27 to 30 for the second blade remaining covering the opening 1*a*.

Figure 14:
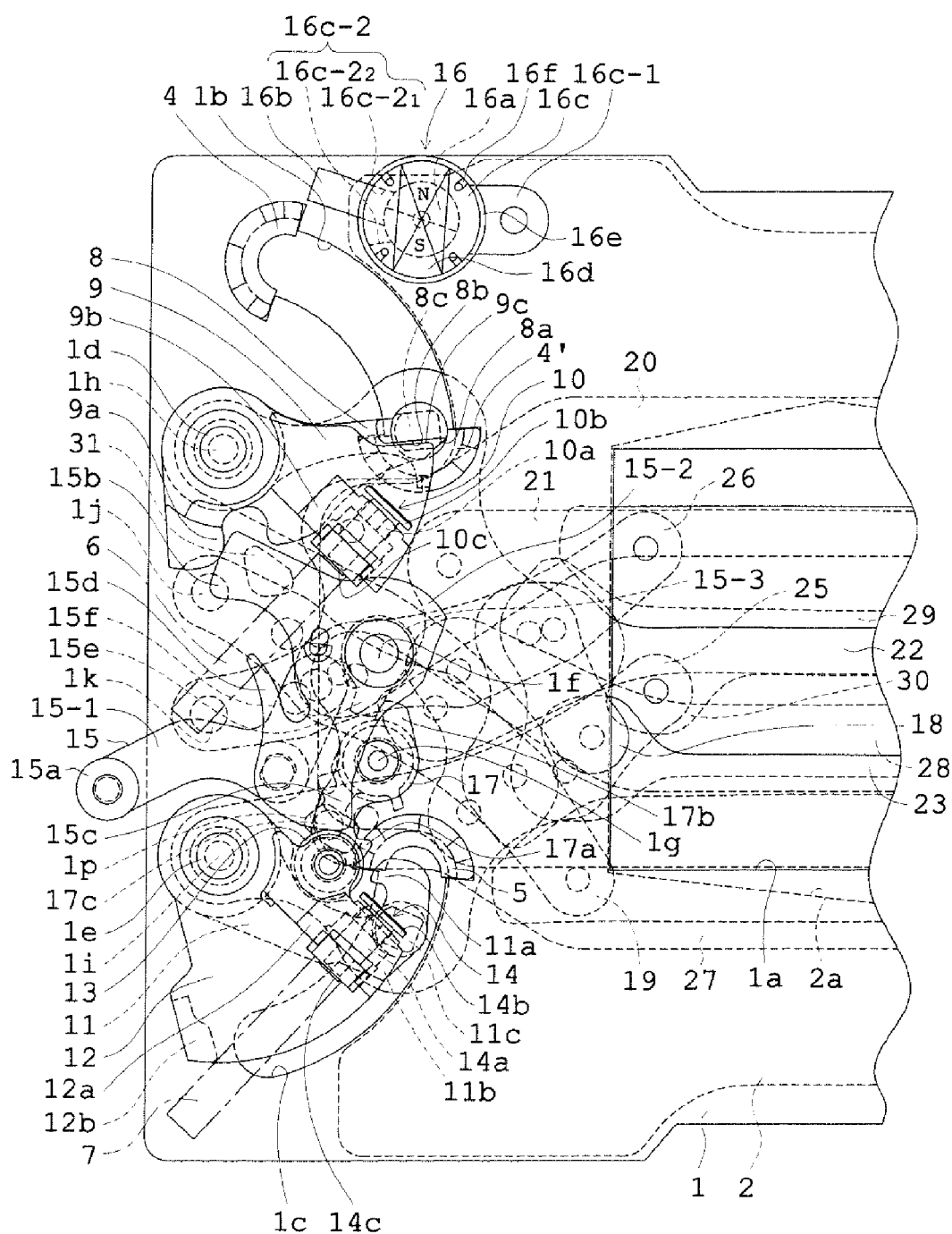
FIG. 14 is a plane view showing a state in which the cocking operation progresses more than the cocking operation does in FIG. 13, the second blade-driving first unit is released from the engagement with the locking unit after the first blade covers the exposure opening and the second blade is in the middle of beginning to open the exposure opening.

Afterward, when the four plate blades 20 to 23 for the first blade completely cover the opening 1*a*, the iron parts 10*c* and 14*c* of the iron piece elements 10 and 14 which are fitted to the first blade-driving and second blade-driving second units 9 and 12 respectively meet the magnetic poles of the iron core elements 6 and 7 of the electromagnets for the first and second blades respectively, one after the other. And, the transfer of the imaging information to the storage device has been already complete around this point. Also, when the iron parts 10*c* and 14*c* of the iron piece elements 10 and 14 meet the magnetic poles of the iron core elements 6 and 7 respectively, the pushing part 15*e* of the cocking unit 15 pushes the pushed part 17*b* of the locking unit 17, so that the locking unit 17 is rotated in the clockwise direction against the elastic force of the spring which is not shown in the drawings. As a result, the engaged part 11*a* of the second blade-driving first unit 11 is released from the engagement with the engaging part 17*a* of the locking unit 17. FIG. 14 shows the state of the focal plane shutter in which the engaged part 11*a* of the second blade-driving first unit 11 is released from the engagement with the engaging part 17*a* through the pushed part 17*b* of the locking unit 17 in such a manner.

The cocking unit 15 is stopped after the cocking unit 15 is slightly rotated afterward. In that process, the iron parts 10*c* and 14*c* of the iron piece elements 10 and 14 are pushed into the fitting parts 9*b* and 12*a* against the elastic forces of the compression springs which are not shown in the drawings, respectively. As a result, a part of each of the shafts 10*a* and 14*a* appears on the opposite side, so that the head parts 10*b* and 14*b* separate from the fitting parts 9*b* and 12*a*, respectively. Also, when the second blade-driving first unit 11 is released from the engagement with the locking unit 17, the second blade-driving first unit 11 is rotated in the clockwise direction by the elastic force of the second blade-cocking spring not shown in the drawings. As a result, the four plate blades 27 to 30 for the second blade move downward while amounts of the overlaps between adjacent plate blades of the four plate blades 27 to 30 are increasing, so that the opening 1a is opened. FIG. 14 shows a process in which the four plate blades 27 to 30 for the second blade open the opening 1a in such a manner.

Figure 15:
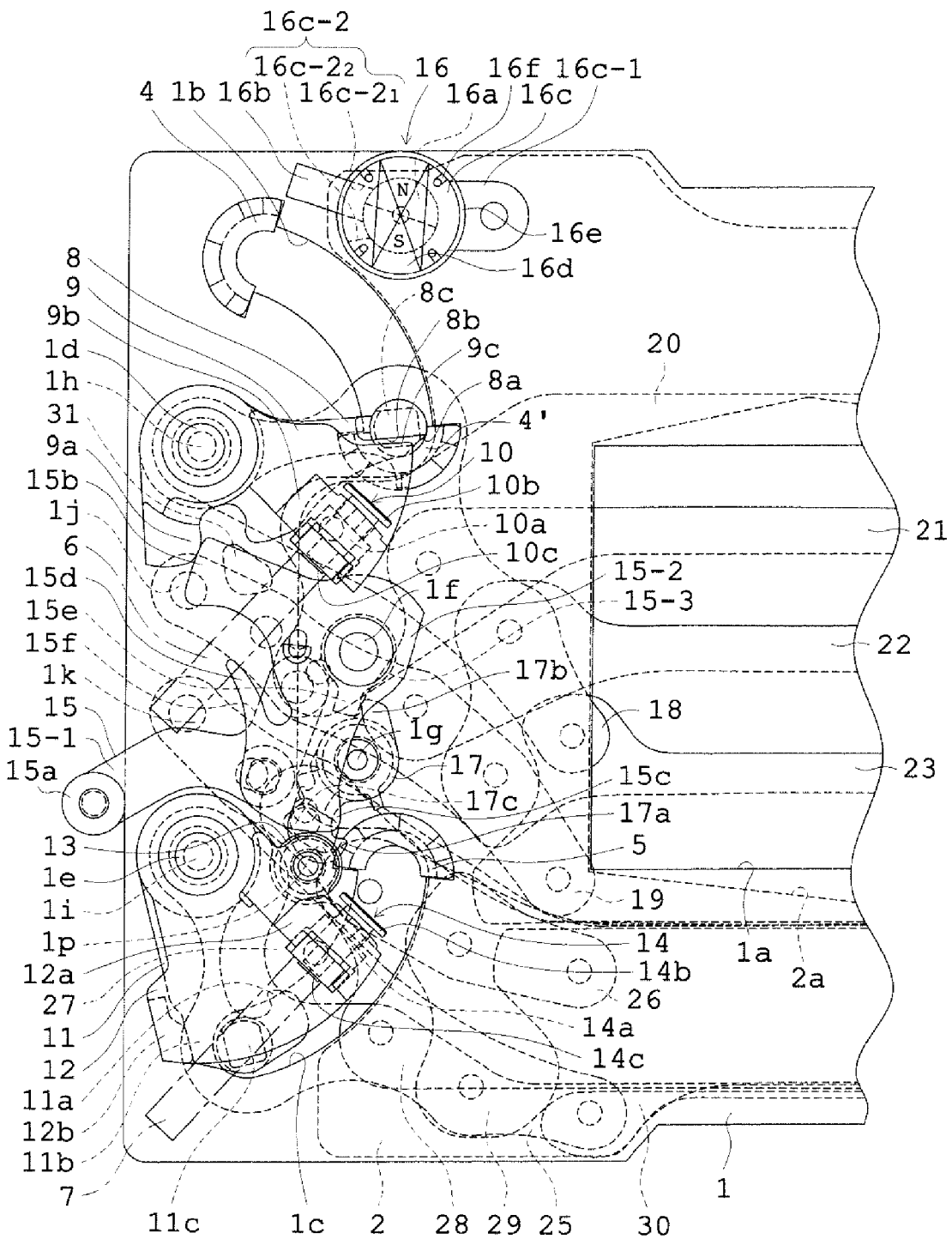
FIG. 15 is a plane view showing a state in which the cocking operation in the normally closed method is complete, the first blade covers the exposure opening, and the second blade stays away from the exposure opening.

When the cocking unit 15 is stopped in its cocking position in such a manner, the pushed part 11b of the second blade-driving first unit 11 meets the pushing part 12b of the second blade-driving second unit 12, so that the second blade-driving first unit 11 is also stopped, and the four plate blades 20 to 23 for the first blade completely cover the opening 1a and the four plate blades 27 to 30 for the second blade moves downward to completely stay away from the opening 1a. That state is shown in FIG. 15 and is a state in which the cocking operation of the focal plane shutter is complete, or a state in which the focal plane shutter is on standby for next shooting. The camera body-side unit makes the cocking unit 15 maintain this state shown in FIG. 15 against the elastic force of the return spring until next shooting, the return spring not being shown in the drawings.

Next, the case where next shooting is performed in such a cocking-completion state of the focal plane shutter is explained. When a release button of a camera is pressed in the state of the focal plane shutter shown in FIG. 15 while the image of an object is being observed through the optical view finder, the electromagnets for the first and second blades are magnetized ("ON" in FIG. 19) before the start of actual shooting (exposure operation), so that the iron piece elements 10 and 14 are attracted by the iron core elements 6 and 7 to be held, respectively. Next, the camera body-side unit which is not shown in the drawings releases the cocking unit 15 from the push of the pushed part 15a due to the camera body-side unit, so that the cocking unit 15 is rotated in the clockwise direction by the elastic force of the return spring which is not shown in the drawings, and the cocking unit 15 is made to return to its initial position.

At the initial stage of the operation of the cocking unit 15 returning to its initial position, the pushing part 15b of the cocking unit 15 separates from the pushed part 9a of the first blade-driving second unit 9 and the pushing part 15c of the cocking unit 15 separates from the roller 13 which is fitted to the second blade-driving second unit 12, so that the first blade-driving and second blade-driving second units 9 and 12 are rotated in the counterclockwise direction by the elastic forces of the first blade-driving and second blade-driving springs which are not shown in the drawings, respectively. However, the iron piece elements 10 and 14 are attracted by the iron core elements 6 and 7 to be held respectively, so that the first blade-driving and second blade-driving second units 9 and 12 are rotated slightly, and then their fitting parts 9b and 12a meet the head parts 10b and 14b of the iron piece elements 10 and 14 respectively. As a result, the first blade-driving and second blade-driving second units 9 and 12 are stopped.

Figure 16:
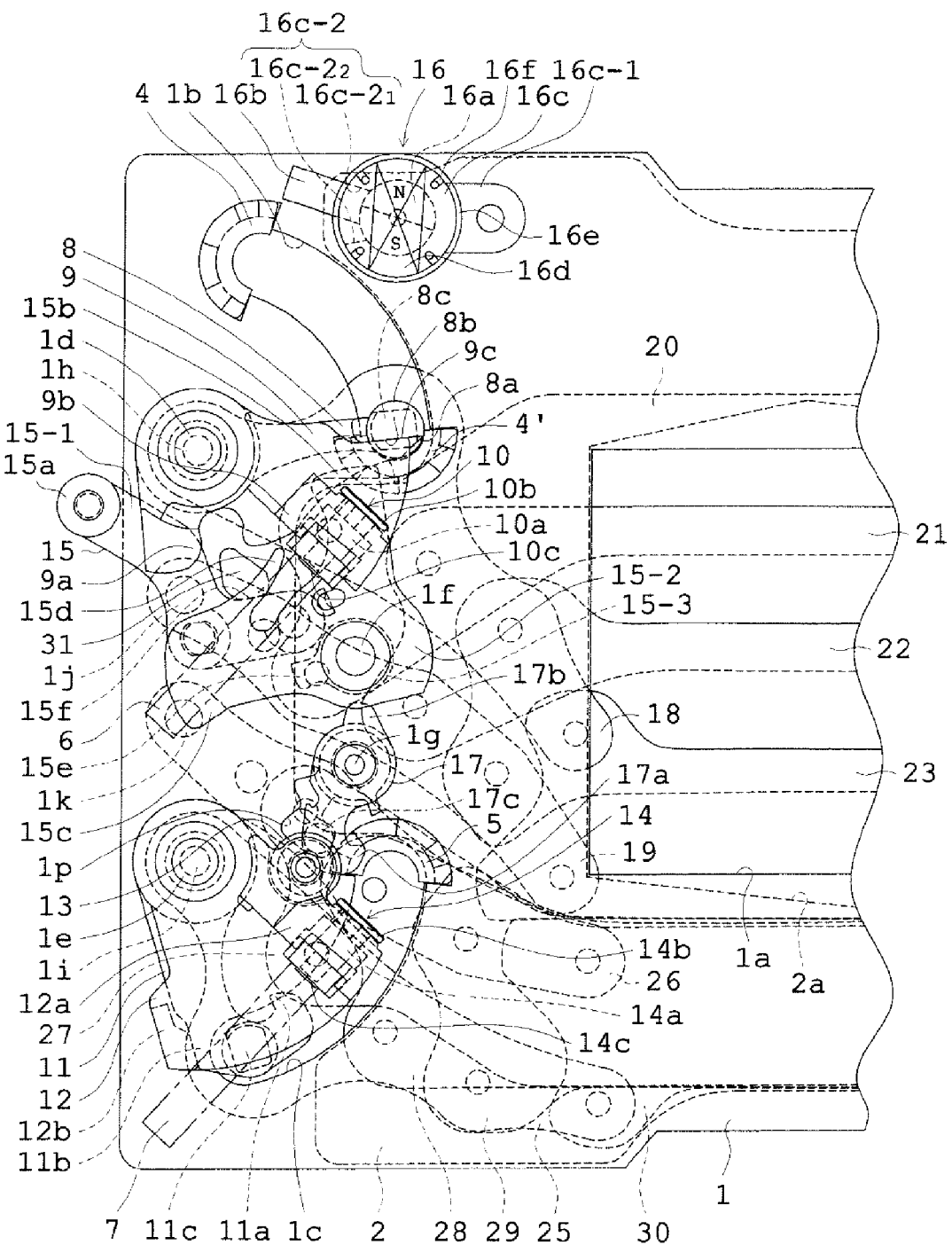
FIG. 16 is a plane view showing a state in which the cocking unit returns to its initial position, prior to the exposure operation of the focal plane shutter after the release button of the camera is pressed from the state shown in FIG. 15.

Such a slight rotation of the first blade-driving second unit 9 makes the pushing part 9c of the first blade-driving second unit 9 pushes the pushed part 8b of the first blade-driving first unit 8, so that the first blade-driving first unit 8 is also rotated slightly against the elastic force of the first blade-cocking spring not shown in the drawings. As a result, the four plate blades 20 to 23 for the first blade also move slightly upward but are stopped before the four plate blades 20 to 23 start to open the opening 1a. Also, such a slight rotation of the second blade-driving second unit 12 makes the pushing part 12b of the second blade-driving second unit 12 push the pushed part 11b of the second blade-driving first unit 11, so that the second blade-driving first unit 11 is also rotated slightly against the elastic force of the second blade-cocking spring not shown in the drawings. As a result, the four plate blades 27 to 30 for the second blade also move slightly upward but are stopped before the four plate blades 27 to 30 start to cover the opening 1a. The positions which the first blade-driving first unit 8, the first blade, the first blade-driving second unit 9, the second blade-driving first unit 11, the second blade, and the second blade-driving second unit 12 attain in such a manner respectively correspond to exposure operation-starting positions for them, respectively. FIG. 16 shows a state of the focal plane shutter in which: the cocking unit 15 returns to its initial position; the four plate blades 20 to 23 for the first blade are stopped before the four plate blades 20 to 23 for the first blade start to open the opening 1a; and the four plate blades 27 to 30 for the second blade are stopped before the four plate blades 27 to 30 for the second blade start to cover the opening 1a After the cocking unit 15 returns to its initial position, the electromagnets for the first and second blades are demagnetized ("OFF" in FIG. 19) in turn at a predetermined time interval corresponding to the brightness of light from the object. So, when the electromagnet for the first blade is first demagnetized, the attraction of the iron core element 6 to the iron piece element 10 disappears, so that the first blade-driving second unit 9 is rapidly rotated in the counterclockwise direction by the elastic force of the first blade-driving spring which is not shown in the drawings. At this point, the pushing part 9c of the first blade-driving second unit 9 pushes the pushed part 8b of the first blade-driving first unit 8, so that the first blade-driving second unit 9 rotates the first blade-driving first unit 8 in the counterclockwise direction against the elastic force of the first blade-cocking spring not shown in the drawings. As a result, the four plate blades 20 to 23 for the first blade move upward while amounts of the overlaps between adjacent plate blades of the four plate blades 20 to 23 are increasing, so that the opening 1a is opened through the lower edge of the slit-forming plate blade 23.

Figure 17:
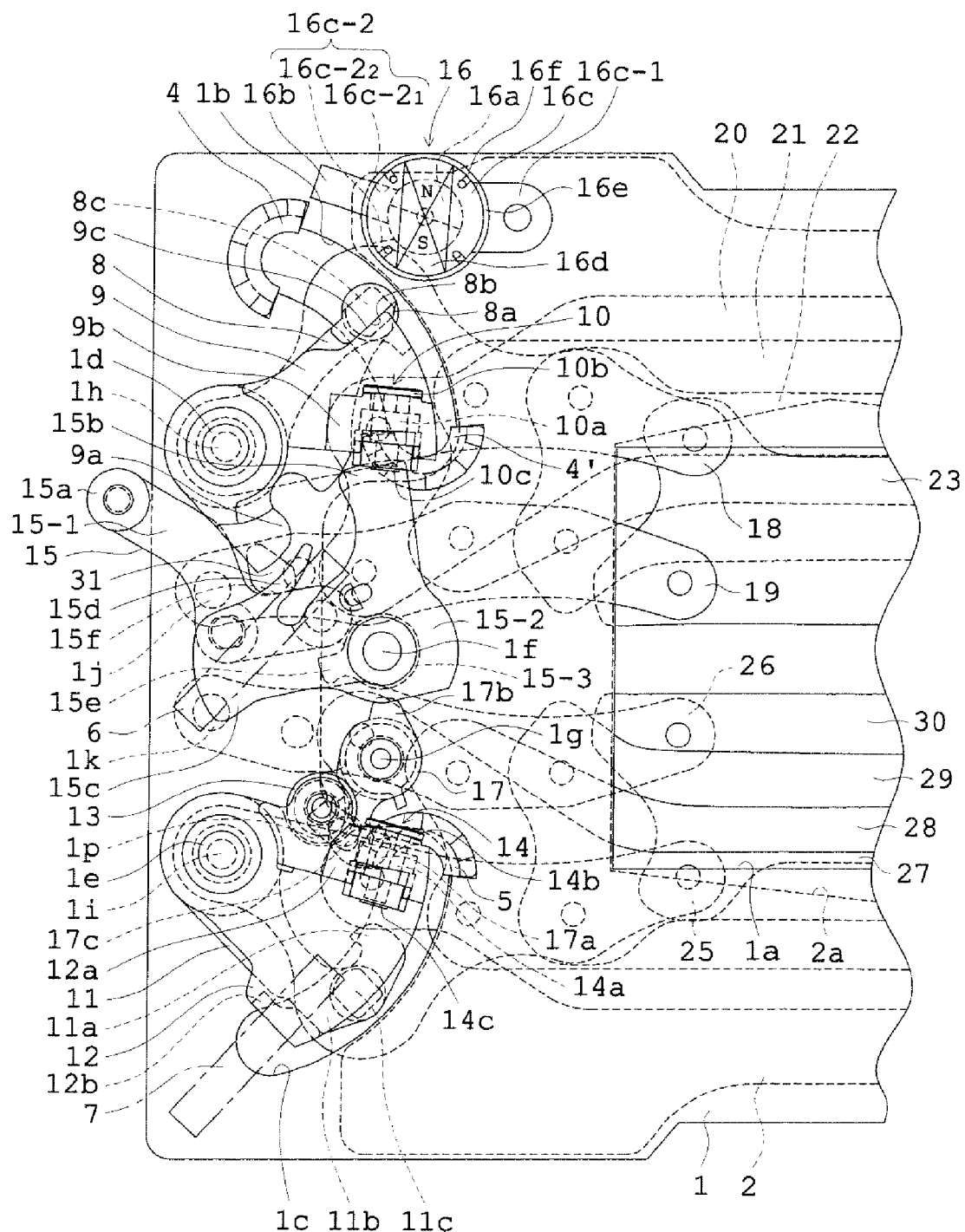
FIG. 17 is a plane view showing a state of the focal plane shutter after the first and second blades start their exposure operations respectively from the state shown in FIG. 16.

When the electromagnet for the second blade is demagnetized after the predetermined time passes by since the electromagnet for the first blade was demagnetized, the attraction of the iron core element 7 to the iron piece element 14 disappears, so that the second blade-driving second unit 12 is rapidly rotated in the counterclockwise direction by the elastic force of the second blade-driving spring which is not shown in the drawings. At this point, the pushing part 12b of the second blade-driving second unit 12 pushes the pushed part 11b of the second blade-driving first unit 11, so that the second blade-driving second unit 12 rotates the second blade-driving first unit 11 in the counterclockwise direction against the elastic force of the second blade-cocking spring. As a result, the four plate blades 27 to 30 for the second blade move upward while amounts of the overlaps between adjacent plate blades of the four plate blades 27 to 30 are decreasing, so that the opening 1a is closed through the upper edge of the slit-forming plate blade 30. As a result, afterward, the image plane of the image sensor is exposed from the lower side of the image plane to the upper side of the image plane continuously by a slit which is formed between the slit-forming plate blades 23 and 30 of the first and second blades. FIG. 17 shows a state of the focal plane shutter in which the focal plane shutter is in the middle of such an exposure operation.

At the final stage of the exposure operation performed in such a manner, the pushed part 9a of the first blade-driving second unit 9 first comes into contact with the braking part 15d of the cocking unit 15, so that the first blade-driving second unit 9 is braked while the first blade-driving second unit 9 is bending the braking part 15d. And then, the engaged part 11a of the second blade-driving first unit 11 meets the engagement part 17a of the locking unit 17, so that the second blade-driving second unit 12 is braked while rotating the locking unit 17 in the clockwise direction against the elastic force of the spring which is not shown in the drawings. FIG. 18 shows a state of the focal plane shutter in which: the first blade-driving first unit 8 is in the final stage of such a rotation of the first blade-driving second unit 8 braked in such a manner; and the engaged part 11a is made to meet the engagement part 17a of the locking unit 17 so that the second blade-driving second unit 12 is braked in such a manner.

And, the pushed part 9a of the first blade-driving second unit 9 separates from the braking part 15d of the cocking unit 15 just after the state of the focal plane shutter which is shown in FIG. 18, and the driving pin 8c of the first blade-driving first unit 8 meets the buffer component 4 afterward, so that the two first blade-driving units 8 and 9 and the first blade are stopped.

Next, when the engaged part 11a of the second blade-driving first unit 11 that is braked by the locking unit 17 up to now pushes the engagement part 17a of the locking unit 17 to rotate the locking unit 17 clockwise and then the locking unit 17 reaches a state in which the locking unit 17 can rotate in the counterclockwise direction by the elastic force of the spring not shown in the drawings, the driving pin 11c of the second blade-driving first unit 11 meets the buffer component 5, so that the two second blade-driving units 11 and 12 and the second blade are stopped. Also, a counterclockwise rotation of the locking unit 17 makes the engagement part 17a of the locking unit 17 engage with the engaged part 11a of the second blade-driving first unit 11. As a result, a bounce of the second blade-driving first unit 11 is stopped, and the exposure operation of the focal plane shutter is complete. FIG. 12 shows such a state of the focal plane shutter.

Figure 20:
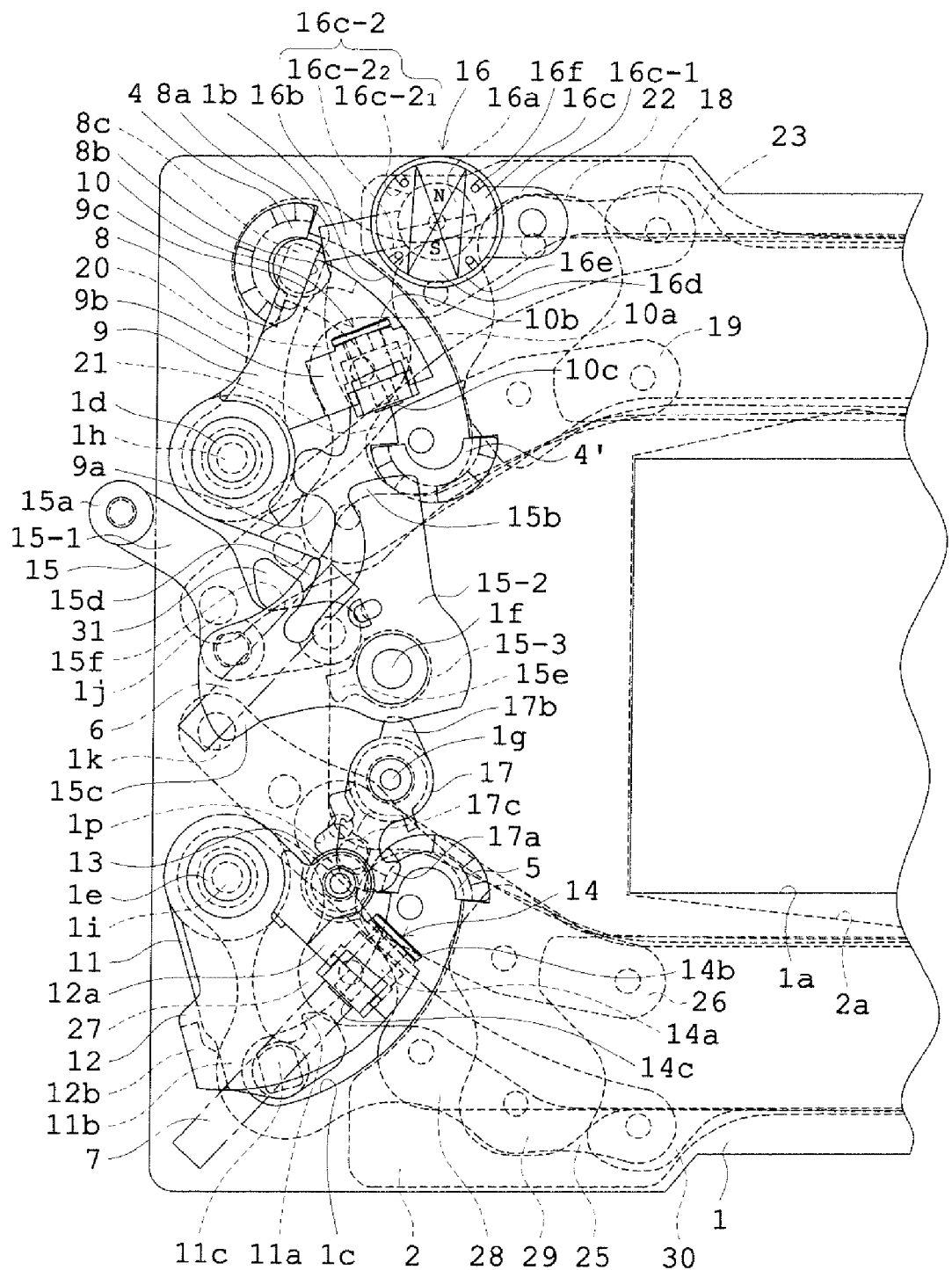
FIG. 20 is an explanatory view showing a state of the focal plane shutter in which shooting is performed in the case where the focal plane shutter for cameras of the present embodiment is provided with an electronic shutter instead of the first blade.
Figure 21:
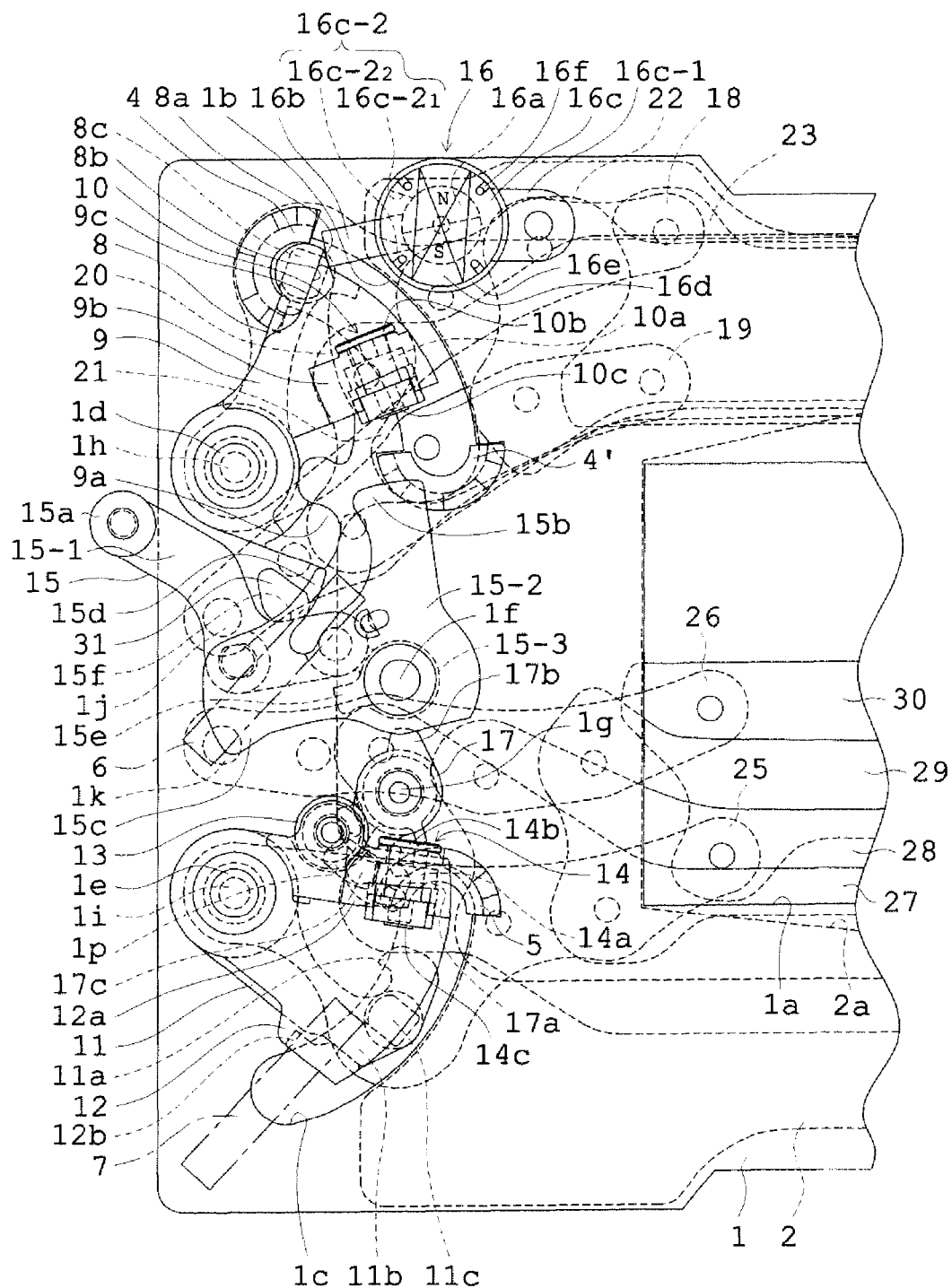
FIG. 21 is a plane view showing a state of the focal plane shutter after the second blade starts its exposure operation from the state shown in FIG. 20.
Figure 22:
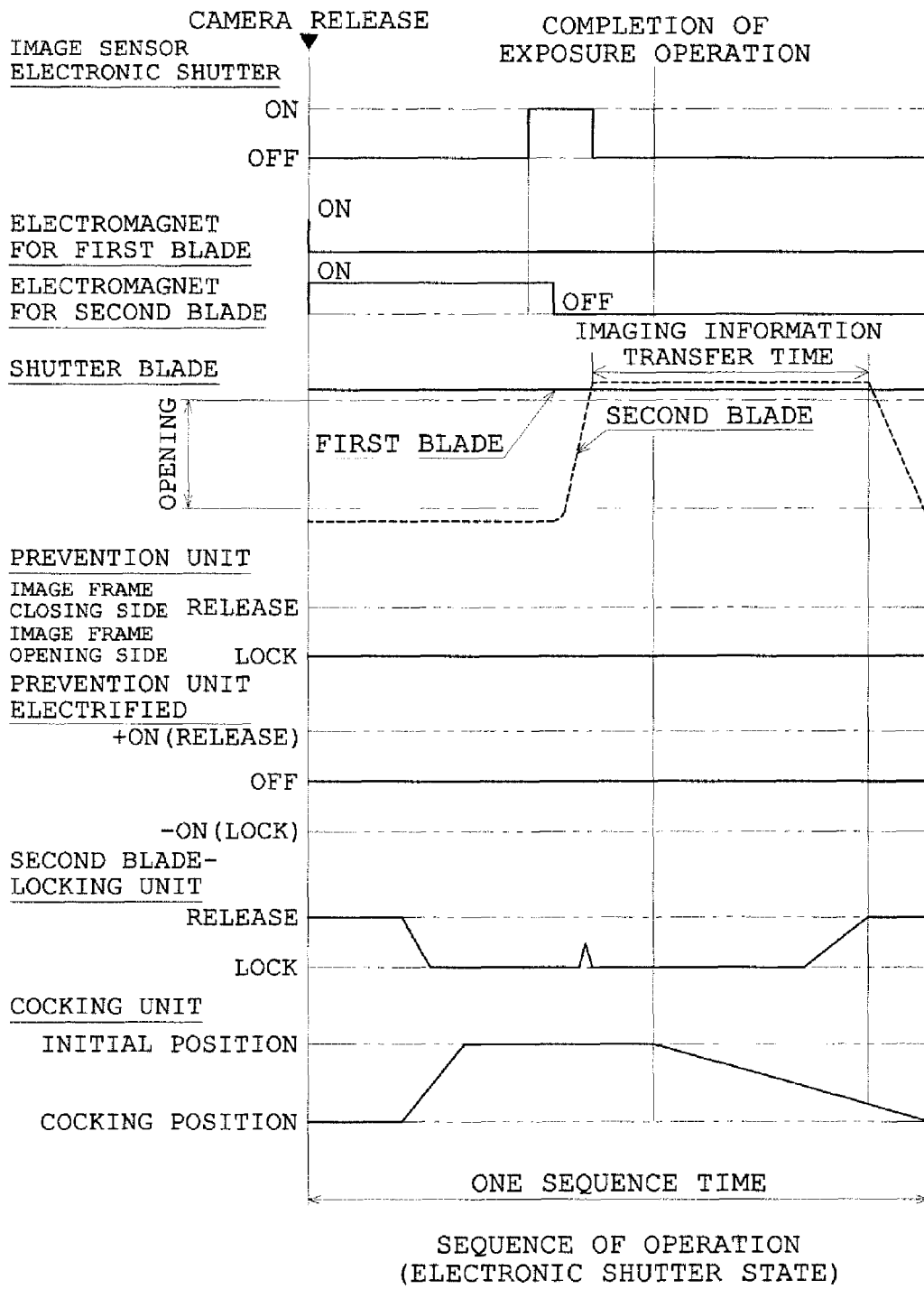
FIG. 22 is an explanatory view showing an operation sequence of each main unit when a press of the release button of the camera after the completion of the cocking operation of the focal plane shutter, the exposure operation of the focal plane shutter, and then the cocking operation of the focal plane shutter are performed, in the case where the electronic shutter is used instead of the first blade in the focal plane shutter for cameras according to the present embodiment.

Next, in the focal plane shutter for cameras according to the present embodiment, an operation of the focal plane shutter in the shooting mode with an electronic shutter instead of the first blade is explained using the plane views of FIGS. 20 and 21 showing stages of the operation of the focal plane shutter respectively and the timing chart of FIG. 22 showing the relations between the operations of the main components of the focal plane shutter, the shooting mode with an electronic shutter instead of the first blade being a shooting mode in which: the first blade is not made to operate but an image sensor is controlled by an electronic control circuit so that shooting starts, when the release button is pressed in the shooting; and the second blade closes the exposure opening, so that the shooting is complete.

Because the shooting mode with an electronic shutter instead of the first blade for the focal plane shutter of the present embodiment is a shooting mode in which an electric finder is used for shooting, a movable mirror not shown in the drawings moves up to be in an "up"-state when a camera is provided with the movable mirror. Also, the coil 16d of the prevention unit 16 is not electrified, and the permanent magnetic rotator 16a is kept in a state in which the lateral portion of the prevention element 16b meets the side edge 16c-2$_2$ of the window 16c-2. The prevention element 16b is in a trajectory of the operation of the prevention part 8a of the first blade-driving first unit 8 and reaches to the upper end portion of the arc-shaped elongate hole 1b, and the front surface of the prevention element 16b comes into contact with the surface of the prevention part 8a of the first blade-driving first unit 8 while the prevention part 8a of the first blade-driving first unit 8 is meeting the buffer component 4. As a result, the focal plane shutter is kept in a state in which a rotation of the first blade-driving first unit 8 making the first blade close the exposure opening is prevented.

Because the operation of the focal plane shutter from the state of the focal plane shutter just after the completion of exposure operation shown in FIG. 2 to the cocking operation-completion state of the focal plane shutter shown in FIG. 5 in the shooting mode with an electronic shutter is the same as that in the shooting mode in the normally open method, an explanation about such an operation of the focal plane shutter is omitted.

Next, the case where next shooting is performed in such a cocking state of the focal plane shutter is explained. When a release button of a camera is pressed in the state of the focal plane shutter shown in FIG. 5 while the image of an object is being observed through the electronic view finder, the electromagnet for the second blade is magnetized ("ON" in FIG. 22) before the start of actual shooting (exposure operation), so that the iron piece element 14 is attracted by the iron core element 7 to be held.

Next, the camera body-side unit which is not shown in the drawings releases the cocking unit 15 from the push of the pushed part 15a due to the camera body-side unit, so that the cocking unit 15 is rotated in the clockwise direction by the elastic force of the return spring which is not shown in the drawings, and the cocking unit 15 is made to return to its initial position.

At the initial stage of the operation of the cocking unit 15 returning to its initial position, the pushing part 15b of the cocking unit 15 separates from the pushed part 9a of the first blade-driving second unit 9 and the pushing part 15c of the cocking unit 15 separates from the roller 13 which is fitted to the second blade-driving second unit 12, so that the first blade-driving and second blade-driving second units 9 and 12 are rotated in the counterclockwise direction by the elastic forces of the first blade-driving and second blade-driving springs which are not shown in the drawings, respectively. The pushing part 9c of the first blade-driving second unit 9 of them meets the pushed part 8a of the first blade-driving first unit 8, so that the first blade-driving second unit 9 is stopped. Also, the iron piece element 14 is attracted by the iron core element 7 to be held, so that the second blade-driving second unit 12 is rotated slightly, and then at this point, its fitting part 12a meets the head part 14b of the iron piece element 14, so that the second blade-driving second unit 12 is stopped.

Such a slight rotation of the second blade-driving second unit 12 makes the pushing part 12b of the second blade-driving second unit 12 push the pushed part 11b of the second blade-driving first unit 11, so that the second blade-driving first unit 11 is also rotated slightly against the elastic force of the second blade-cocking spring not shown in the drawings. As a result, the four plate blades 27 to 30 for the second blade also move slightly upward but are stopped before the four plate blades 27 to 30 start to cover the opening 1a. The positions which the first blade-driving second unit 9, the second blade-driving first unit 11, the second blade, and the second blade-driving second unit 12 attain in such a manner respectively correspond to exposure operation-starting positions for them, respectively. FIG. 20 shows a state of the focal plane shutter just before the start of an exposure operation of the focal plane shutter in which the cocking unit 15 returns to its initial position.

After the cocking unit 15 returns to its initial position, the electronic shutter instead of the first blade is switched on and the electronic control circuit controls the image sensor, so that shooting is started. And, the electromagnet for the second blade is demagnetized ("OFF" in FIG. 22) after set time determined in accordance with the brightness of light from the object passes by.

When the electromagnet for the second blade is demagnetized, the attraction of the iron core element 7 to the iron piece element 14 disappears, so that the second blade-driving second unit 12 is rapidly rotated in the counterclockwise direction by the elastic force of the second blade-driving spring which is not shown in the drawings. At this point, the pushing part 12*b* of the second blade-driving second unit 12 pushes the pushed part 11*b* of the second blade-driving first unit 11, so that the second blade-driving second unit 12 rotates the second blade-driving first unit 11 in the counterclockwise direction against the elastic force of the second blade-cocking spring. As a result, the four plate blades 27 to 30 for the second blade move upward while amounts of the overlaps between adjacent plate blades of the four plate blades 27 to 30 are decreasing, so that the opening 1*a* is closed through the upper edge of the slit-forming plate blade 30. FIG. 21 shows a state of the focal plane shutter in which the focal plane shutter is in the middle of such an exposure operation.

At the final stage of the exposure operation performed in such a manner, the engaged part 11*a* of the second blade-driving first unit 11 meets the engagement part 17*a* of the locking unit 17, so that the second blade-driving second unit 12 is braked while rotating the locking unit 17 in the clockwise direction against the elastic force of the spring which is not shown in the drawings. Next, when the engaged part 11*a* of the second blade-driving first unit 11 that is braked by the locking part 17 up to now pushes the engagement part 17*a* of the locking unit 17 to rotate the locking unit 17 clockwise and then the locking unit 17 reaches a state in which the locking unit 17 can rotate in the counterclockwise direction by the elastic force of the spring not shown in the drawings, the driving pin 11*c* of the second blade-driving first unit 11 meets the buffer component 5, so that the two second blade-driving units 11 and 12 and the second blade are stopped. Also, at almost the same time as the driving pin 11*c* of the second blade-driving first unit 11 meets the buffer component 5, the electronic shutter that is used instead of the first blade is switched off. Also, a counterclockwise rotation of the locking unit 17 makes the engagement part 17*a* of the locking unit 17 engage with the engaged part 11*a* of the second blade-driving first unit 11. As a result, a bounce of the second blade-driving first unit 11 is stopped, and the exposure operation of the focal plane shutter is complete. Such a state of the focal plane shutter is the same as the state of the focal plane shutter shown in FIG. 2.

According to the present embodiment of the present invention, in a focal plane shutter for cameras which makes it possible to switch a normally open method and a normally closed method to each other, the second blade can be kept intercepting light from an image frame until just before a completion of a shutter-cocking operation of the focal plane shutter after a start of the cocking operation of the shutter in shooting performed in the normally open method, so that it is possible to transfer data on captured images from the image sensor to the storage in the middle of the cocking operation, it is possible to shorten time necessary for a sequence of the processes ranging from shooting to the capture of the data, and it is possible to make a frame rate high also in a image sensor needing a long data-transferring time. Also, the focal plane shutter according to the present embodiment is formed to have a structure in which the first blade is made to completely cover the exposure opening by the pushing part 15*b* of the cocking unit 15 pushing the pushed part 9*a* of the first blade-driving second unit 9 in a cocking operation of the focal plane shutter, before the locking unit 17 is made to release the second blade from the engagement of the second blade with the locking unit 17 by the pushing part 15*e* pushing the pushed part 17*b*, so that timing at which the first blade completely covers the exposure opening is before the locking unit releases the second blade from the engagement of the second blade with the locking unit, in shooting performed in the normally closed method. As a result, it is possible to transfer data on captured images from the image sensor to the storage in the cocking operation without opening the image frame in the middle of the cocking operation of the shutter, it is possible to shorten time necessary for the sequence of the processes ranging from shooting to the capture of the data, and it is possible to make a frame rate high also in the image sensor needing a long data-transferring time.

Accordingly, according to the present embodiment, it is possible to obtain: a focal plane shutter for cameras in which shooting performed in the normally open method and shooting performed in the normally closed method can be switched to each other, which can make a frame rate high, and which makes it possible to determine the period from the time the exposure operation is complete to the time next shooting is performed with time necessary for transferring the imaging information hardly taken into consideration; and a digital camera provided with the same.

In addition, according to the present embodiment, the focal plane shutter is operated in shooting in the normally open method, in such a way that: the prevention unit 16 moves in a direction in which the first blade-driving first unit 8 is released from the prevention of the rotation of the first blade-driving first unit 8 making the first blade close the exposure opening, after the completion of a cocking operation of the cocking unit 15, to release the prevention of the rotation of the first blade-driving first unit 8 making the first blade close the exposure opening; and the prevention unit 16 moves in a direction in which a rotation of the first blade-driving first unit 8 making the first blade close the exposure opening is prevented just before an exposure operation of the focal plane shutter, after the first blade-driving first unit 8 is rotated to make the first blade close the exposure opening. As a result, a rotation of the first blade-driving first unit 8 making the first blade open the exposure opening can be braked, and it is possible to prevent a bounce of the first blade-driving first unit 8 which is caused by the contact between the driving pin 8*c* of the first blade-driving first unit 8 and the buffer component 4 on completion of the exposure operation of the focal plane shutter. As a result, it is possible to hasten a cocking operation of the focal plane shutter the more. Accordingly, the length of time from the first shooting to the next shooting can be shortened in the present example of variations of the focal plane shutter, and the present example of variations of the focal plane shutter is advantageous to the use for digital cameras with which continuous shooting can be performed.

Accordingly, also according to the present example of variations of the focal plane shutter, it is possible to obtain: a focal plane shutter for cameras which can make a frame rate high, and which makes it possible to determine the period from the time the exposure operation is complete to the time next shooting is performed with time necessary for transferring the imaging information hardly taken into consideration; and a digital camera provided with the same.

Besides, in each focal plane shutter of the above-described embodiment, the normally open method and the normally closed method can be switched to each other by a switch provided on the camera-body side. However, a focal plane shutter according to the present invention is not formed in such a manner but may be formed to be capable of operating by making a selection of the normally open method or the normally closed method or to be capable of operating in a combination of the normally open method and the normally closed method, in accordance with continuous-shooting speeds in a continuous-shooting mode.

That is to say, it is because: the first blade has to be made to move to its exposure operation-starting position after a release of the shutter in the normally open method, as shown in FIG. 6; and, on the other hand, the normally closed method does not need such a movement of the first blade, so that a period of one cycle becomes short and its continuous-shooting speed becomes high.

Besides, in the present embodiment, the prevention unit 16 is composed of an electromagnetic device, and the prevention element 16b is formed as a mover for the electromagnetic device which is capable of moving in a reciprocating manner. However, prevention units 16 for focal plane shutters for cameras according to the present invention are not limited to such a constitution. For example, a prevention unit 16 for a focal plane shutter according to the present invention may be formed to include: a spring capable of moving a prevention element 16b in a direction in which a rotation of the first blade-driving first unit 8 making the first blade close the exposure opening is prevented; and an electromagnetic device capable of moving the prevention element 16b against the elastic force of that spring in a direction in which the prevention of the rotation of the first blade-driving first unit 8 making the first blade close the exposure opening is released or capable of releasing the prevention unit 16 from the movement of the prevention element 16b which releases the first blade-driving first unit 8 from the prevention of the rotation of the first blade-driving first unit 8 making the first blade close the exposure opening.

Also, a permanent magnetic rotator or a solenoid may be used as an electromagnetic device capable of moving the prevention element 16b in a direction in which the prevention of the rotation of the first blade-driving first unit 8 making the first blade close the exposure opening is released, against the elastic force of the spring capable of moving the prevention element 16b in the direction in which the rotation of the first blade-driving first unit 8 making the first blade close the exposure opening is prevented, or capable of releasing the prevention unit 16 from the movement of the prevention element 16b which releases the first blade-driving first unit 8 from the prevention of the rotation of the first blade-driving first unit 8 making the first blade close the exposure opening.

The invention claimed is:

1. A focal plane shutter for cameras that switch between shooting in a normally open method and shooting in a normally closed method, comprising:

a first blade-driving unit that keeps a first blade away from an exposure opening while a cocking unit is in a cocking position and keeps the first blade covering the exposure opening while the cocking unit is returning to an initial position, during shooting performed in the normally open method, and keeps the first blade covering the exposure opening from the time the cocking unit is in the cocking position until an exposure operation of the focal plane shutter starts after the cocking unit returns to the initial position, during shooting performed in the normally closed method;

a second blade-driving first unit engaging with and locked by a locking unit during at least part of a cocking operation of the cocking unit so as to keep a second blade covering the exposure opening, and making the second blade move away from the exposure opening when the second blade-driving first unit is released from the engagement with the locking unit just before the cocking unit reaches the cocking position; and a second blade-driving second unit rotated by the cocking operation of the cocking unit in a direction bringing the second blade-driving second unit to a cocking state, and rotating the second blade-driving first unit during the exposure operation in a direction in which the second blade-driving first unit is made to perform the exposure operation, so as to make the second blade cover the exposure opening.

2. The focal plane shutter for cameras according to claim 1, wherein the first blade completely covers the exposure opening through the first blade-driving unit before the second blade-driving first unit is released from the engagement with the locking unit, when the cocking unit performs the cocking operation during shooting performed in the normally closed method.

3. The focal plane shutter for cameras according to claim 1, wherein the cocking unit includes a first pushing portion, the locking unit includes a first portion to be pushed, and the first pushing portion of the cocking unit pushes the first portion to be pushed of the locking unit just before the completion of the cocking operation of the cocking unit so that the second blade-driving first unit is released from the engagement with the locking unit.

4. The focal plane shutter for cameras according to claim 1, wherein the cocking unit further includes a second pushing portion, the first blade-driving unit includes a second portion to be pushed, and the second pushing portion of the cocking unit pushes the second portion to be pushed of the first blade-driving unit in the cocking operation during shooting performed in the normally closed method so that the first blade-driving unit makes the first blade cover the exposure opening.

5. The focal plane shutter for cameras according to claim 1, wherein the first blade-driving unit includes a prevention part which comes into contact with a prevention unit to prevent the first blade-driving first unit from rotating in a direction in which the first blade is made to close the exposure opening or is released from the contact with the prevention unit to release the first blade-driving first unit from the prevention of the rotation of the first blade-driving first unit in that direction, the rotation of the first blade-driving unit in that direction making the first blade close the exposure opening, and shooting performed in the normally open method and shooting performed in the normally closed method are switched to each other in accordance with the prevention of the rotation of the first blade-driving first unit in the direction in which the first blade is made to close the exposure opening or the release of the first blade-driving unit from the prevention of the rotation of the first blade-driving first unit in that direction, the rotation of the first blade-driving unit in that direction making the first blade close the exposure opening.

6. The focal plane shutter for cameras according to claim 1, wherein the first blade-driving unit includes a first blade-driving second unit biased by a first blade-driving spring in a direction in which the first blade-driving second unit is made to perform the exposure operation, and a first blade-driving first unit connected to the first blade and biased by a cocking spring in the direction opposite to the direction in which the first blade-driving second unit is made to perform the exposure operation.

7. The focal plane shutter for cameras according to claim 6, wherein the prevention unit includes a prevention element that moves either in a direction in which the prevention element is made to prevent the first blade-driving first unit from being rotated in the direction in which the first blade is made to close the exposure opening or in a direction in which the prevention element is made to release the first blade-driving first unit from the prevention of a rotation of the first blade-driving first unit in that direction, the rotation of the first blade-driving first unit in that direction making the first blade close the exposure opening, and in the case of shooting performed in the normally open method, the prevention element releases the first blade-driving first unit from the prevention of a rotation of the first blade-driving first unit in that direction, the rotation of the first blade-driving first unit in that direction making the first blade close the exposure opening, after the cocking operation of the cocking unit is complete, the prevention element moves in the direction in which the prevention element is made to prevent a rotation of the first blade-driving first unit in that direction, the rotation of the first blade-driving first unit in that direction making the first blade close the exposure opening, before an exposure operation of the focal plane shutter after the first blade-driving first unit rotates to make the first blade close the exposure opening, the prevention element brakes a rotation of the first blade-driving first unit in a direction in which the first blade is made to open the exposure opening, just before the exposure operation is complete, and then the prevention element prevents the first blade-driving first unit from being rotated in the direction in which the first blade is made to close the exposure opening, when the exposure operation is complete.

8. The focal plane shutter for cameras according to claim 7, wherein the prevention unit is an electromagnetic device and the prevention element is a mover for the electromagnetic device, which moves in a reciprocating manner.

9. The focal plane shutter for cameras according to claim 7, wherein the prevention unit includes a spring that moves the prevention element in the direction in which the prevention element is made to prevent a rotation of the first blade-driving first unit in such a direction as the first blade is made to close the exposure opening, and an electromagnetic device that moves the prevention element against an elastic force of the spring that moves the prevention element in the direction in which the prevention element is made to prevent the rotation of the first blade-driving first unit in the direction which makes the first blade close the exposure opening, so as to release the first blade-driving first unit from the prevention of the rotation of the first blade-driving first unit in the direction, the rotation of the first blade-driving first unit in the direction making the first blade close the exposure opening, and releases the prevention element from the movement of the prevention element against the elastic force of the spring, the movement of the prevention element against the elastic force of the spring releasing the first blade-driving first unit from the prevention of the rotation of the first blade-driving first unit in the direction which makes the first blade close the exposure opening.

10. The focal plane shutter for cameras according to claim 7, wherein the prevention element also has a function of preventing the first blade-driving first unit from bouncing on completion of the exposure operation.

11. The focal plane shutter for cameras according to claim 1, wherein the locking unit also has a function of preventing the second blade-driving first unit from bouncing on completion of the exposure operation.

12. A digital camera comprising the focal plane shutter according to claim 1.

* * * * *